US012507756B2

(12) United States Patent
Cobbett et al.

(10) Patent No.: US 12,507,756 B2
(45) Date of Patent: Dec. 30, 2025

(54) ARTICLE OF FOOTWEAR WITH LINER HAVING EXTERNAL GROUND PLANE

(71) Applicant: NIKE, Inc., Beaverton, OR (US)

(72) Inventors: Jamian R. Cobbett, Portland, OR (US); Paul D. Cox, Beaverton, OR (US); Joseph B. Gault, West Linn, OR (US); Robert G. LeGaye, Portland, OR (US); Phillip A. Meneau, Portland, OR (US); Summer L. Schneider, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 47 days.

(21) Appl. No.: 18/660,684

(22) Filed: May 10, 2024

(65) Prior Publication Data

US 2024/0380101 A1 Nov. 14, 2024

Related U.S. Application Data

(60) Provisional application No. 63/465,980, filed on May 12, 2023, provisional application No. 63/465,972, (Continued)

(51) Int. Cl.
*A43B 3/44* (2022.01)
*A43B 3/38* (2022.01)
(Continued)

(52) U.S. Cl.
CPC .................. *A43B 3/38* (2022.01); *A43B 3/44* (2022.01); *H01Q 1/248* (2013.01); *H01Q 1/273* (2013.01); *H01Q 1/48* (2013.01)

(58) Field of Classification Search
CPC ........... H01Q 1/273; H01Q 1/24; H01Q 1/22; H01Q 1/44; A43B 3/34-44
See application file for complete search history.

(56) References Cited

U.S. PATENT DOCUMENTS 10,161,838 B2 * 12/2018 Huang ................ A61B 5/7228
2007/0193070 A1 8/2007 Bertagna et al.
(Continued)

OTHER PUBLICATIONS

"International Application Serial No. PCT US2024 028774, International Search Report mailed Sep. 2, 2024", 6 pgs.
(Continued)

*Primary Examiner* — Hasan Islam
(74) *Attorney, Agent, or Firm* — Quinn IP Law

(57) ABSTRACT

A liner system for an article of footwear, system, and method includes a liner structure, a sensor, a housing, an electronic module, and a ground plane. The sensor is configured to determine a property of the foot of a wearer. The housing is seated at least in part in the liner structure. The electronic module is coupled to the sensor and positioned in the housing and includes an internal wireless transceiver configured to transmit information based on data received from the sensor concerning the property of the foot and an internal antenna, positioned within the housing and operatively coupled to the wireless transceiver, configured to wirelessly transmit the information from the wireless transceiver. The ground plane is operatively coupled to the internal antenna and projects outside of the housing, extending along the liner structure, and configured to extend an effective range of the internal antenna.

20 Claims, 16 Drawing Sheets

Related U.S. Application Data filed on May 12, 2023, provisional application No. 63/465,977, filed on May 12, 2023, provisional application No. 63/465,969, filed on May 12, 2023, provisional application No. 63/465,976, filed on May 12, 2023.

(51) Int. Cl.

| | |
|---|---|
| ***H01Q 1/24*** | (2006.01) |
| ***H01Q 1/27*** | (2006.01) |
| ***H01Q 1/48*** | (2006.01) |

(56) References Cited

U.S. PATENT DOCUMENTS

| | | | |
|---|---|---|---|
| 2010/0004566 | A1 | 1/2010 | Son et al. |
| 2013/0211290 | A1 | 8/2013 | Lee |
| 2020/0021896 | A1 | 1/2020 | Fitzgerald et al. |
| 2022/0015495 | A1 | 1/2022 | Amos et al. |

OTHER PUBLICATIONS

"International Application Serial No. PCT US2024 028774, Written Opinion mailed Sep. 2, 2024", 4 pgs.

* cited by examiner

ARTICLE OF FOOTWEAR WITH LINER HAVING EXTERNAL GROUND PLANE

CROSS-REFERENCE TO RELATED APPLICATIONS

This application claims the benefit of priority to U.S. Provisional Application Ser. No. 63/465,969, filed May 12, 2023; 63/465,972, filed May 12, 2023; 63/465,976, filed May 12, 2023; 63/465,977, filed May 12, 2023, and 63/465,980, filed May 12, 2023, the contents of all which are incorporated herein by reference in their entireties.

BACKGROUND

Electronics have been incorporated into footwear for a variety of purposes. In various cases, sensors have been positioned within footwear to provide information about the user of the footwear and the manner in which the footwear is used by a wearer. Control electronics, such as controllers or processors, have handled data from such sensors, while antennas have allowed for communication with outside devices and power sources have provided power to the various electronic components.

BRIEF SUMMARY

Past examples of the inclusion of electronics into an article of footwear have conventionally been electronics specific to a particular article of footwear. For instance, a pressure sensor may be placed in the sole structure of an article of footwear and, consequently, be integral to the article of footwear and not readily removable from the article of footwear. This inherently limits both what types of articles of footwear may be provided with electronics, as the article of footwear must be designed for and built with the electronics from the beginning, as well as limiting the circumstances in which the electronics may be used, as when the article of footwear is not being worn then the electronics by definition cannot be utilized with any other article of footwear. As a result, when the article of footwear is to be discarded then the electronics may of necessity be discarded as well. And while articles of footwear may relatively readily be recycled in whole or in part, electronics seated within the article of footwear may often be removed with difficulty, if at all, there by rendering the recycling of the article of footwear more difficult and increasing the likelihood of electronics waste.

A system has been developed that places electronics for an article of footwear as part of a readily removable and insertable liner, such as a sock liner, orthotic insert, or bootie. By making the electronics independent of the article of footwear itself, the electronics may be easily moved from footwear to footwear or removed from the footwear when the footwear is ready to be discarded or recycled. Moreover, such electronics may then be provided with configurations advantageous to the efficient performance of the electronics, with configurations that permit antennas, for instance, to extend to locations in the article of footwear more advantageous for communication than may be provided by conventional antennas and electronics locations embedded within an article of footwear. Further, electronics would not then be limited to an article of footwear specifically designed for such electronics but rather may be incorporated into any article of footwear configured to receive a replacement liner, which may be expected to be a substantial proportion of all articles of footwear produced. Consequently, the benefits of electronics being in a removeable and insertable liner in footwear may mitigate or remove altogether the various challenges of electronics embedded in footwear.

In particular, a liner has been developed that includes an electronic module for various electronics and a flexible electronic tab that extends from the electronic module. The electronic module includes an internal antenna and a ground plane that extends out of a housing and along the flexible electronic tab. The expanded ground plane provides for enhanced communication efficiency and range from the internal antenna with an external antenna. As a result, electronics within the liner may provide communication efficiency comparable to that of electronics positioned integrally within an article footwear.

Further, the liner may include an electronic module for various electronics and a flexible electronic tab that extends from the electronic module and up a side of the upper of the article of footwear. In so doing, an antenna or electronic connector may be positioned on the flexible tab and provide better performance for the antenna or improved access to the connector by a user than would be provided if the components were wholly contained within a structure of the liner. As a result, advantages that may be provided by more extensive positioning of electronic components within an article of footwear more generally may be obtained while maintaining the electronics only as a part of the removable liner.

Further, the liner may include an electronic module for various electronics and a flexible electronic tab that extends from the electronic module and up a side of the upper of the article of footwear. The flexible electronic tab includes a recharge antenna that is configured to electrically couple with an external recharge system. The flexible electronic tab may further include a securing mechanism, such as a magnet, to secure a component of the external recharge system to the article of footwear to help establish and maintain alignment between the recharge antenna and the external recharge system. As a result, the benefits of recharging, e.g., a rechargeable power source of the liner may be provided conveniently and adaptably to any suitable article of footwear in which the liner may be inserted.

Further, the liner may include an electronic module for various electronics, including one or more sensors. The electronic module includes an internal antenna configured to communicate with an external antenna of a remote device. The remote device includes a processor to receive data from the sensor and a user interface configured to present the information to a user of the system. Such a system may be particularly useful in circumstances in which, for instance, multiple users, e.g., on a team or within an organization, who may have different articles of footwear may nonetheless swap or replace the liner between and among the articles of footwear and thereby allow each wearer to wear their own footwear while still being able to transmit sensor data to a remote source.

Further, the liner may include an electronic module for various electronics that are configured to communicate and integrate with a larger system. The output of sensors included in the liner may be combined with the output of other sensors in other devices of the system, (e.g., that of smart watches, game controllers, sound mixing systems, haptics, adaptive and adjustable fix systems, and other interactive technology) in order to provide an integrated user interface system that allows a user to control an output of the system, e.g., an audiovisual output or any other suitable output, based on the user's movements or other interaction with the devices of the system. The system provides a specific user interface that allows the user to customize the sources of information that are utilized, how the output of the various sources can be combined to identify events, and how the output of the events can be combined to produce actions for the system to take. The integrated user interface system thereby has the ability to allow the user to extensively or fully customize which sensor outputs are utilized, how the outputs are utilized, and what actions result, allowing the user to minutely and extensively control the output of the system. Such fully integrated, customizable, and controllable user interface sensor systems on body and connected to on-and-off body technology can offer users a platform for new digital and physical ("phygital") experiences.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Example methods and systems are directed to an access control system, devices, and method. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
FIG. 1 is a depiction of an integrated user interface system, in an example embodiment.

FIG. 1 is a depiction of an integrated user interface system 100, in an example embodiment. The integrated user interface system 100 allows a user 102 to utilize a variety of devices with a variety of sensors, such as pressure sensors, accelerometers, gyroscopes, capacitive sensors, conventional user interface articles such as buttons, touch screens, keyboards, mice, and so forth, to provide a range of sensor data. The sensor data may then be combined according to a variety of user-configurable conditions to identify one or more user-defined events. On the basis of identification of the user-defined events, one or more user-defined actions may be taken by the integrated user interface system 100 to produce an output, e.g., an audiovisual output, by the integrated user interface system 100. Given the sensors provided by the devices of the integrated user interface system 100, a user 102 may thereby cause the integrated user interface system 100 to provide such outputs based on a range of natural user motions, ranging from macro-movements such as the movement of the entire body or an entire limb to micro-movements as subtle as shifting the weight of a single part of a single foot. Consequently, the integrated user interface system 100 may allow a user to control an output over a range from virtually unnoticeable actions or on the basis of whole body movement, such as dance or other macro movements.

As illustrated, as user 102 of the integrated user interface system 100 is wearing a pair of articles of footwear 104, as disclosed herein, included in the integrated user interface system 100. The integrated user interface system 100 further optionally includes one or more peripheral devices 106, such as a smart watch, an activity tracker, or the like, and/or a holdable device, such as a video game controller. The integrated user interface system 100 further optionally includes a remote system 108, such as a sound mixing system, a disc jockey (DJ) station, a personal computer, a tablet computer, or any other suitable audiovisual device.

Some or all of the various components of the integrated user interface system 100 include sensors and electronics that allow the components to process and transmit information from the sensors wirelessly throughout the integrated user interface system 100. As will be disclosed in detail herein, at least one of the articles of footwear 104 include a liner with integrated sensors, such as pressure sensors and the like, that are sensitive to pressure exerted, e.g., by a foot or portions of the foot or toes of the user 102 while the user 102 is wearing the article of footwear 104. Moreover, the article of footwear 104 may include other sensors, such as accelerometers, gyroscopes, capacitive sensors, and the like, that allow further information, such as the relationship of the article of footwear 104 to the ground or a predetermined object to be determined. The other devices of the integrated user interface system 100 may similarly include sensors known in the art, including accelerometers, gyroscopes, buttons, touchscreens, keyboards, and so forth, that allow the device to provide a sensor output indicative of a movement or other engagement by the user 102 with the device. Thus, for instance, the peripheral device 106 may provide a sensor output indicative of a physical orientation of the arm of the peripheral device 106. As illustrated, the remote system 108 includes a keyboard 110 and a touchscreen 112 with which the user 102 may interact.

The devices of the integrated user interface system 100 further include the capacity to transmit sensor data between and among various devices of the integrated user interface system 100. Thus, for instance, the article of footwear 104, the peripheral device 106, and the remote system 108 all include a wireless transceiver that are configured to communicate according to a wireless communication modality, for instance, without limitation, the Bluetooth low energy (BLE) standard. As such, the article of footwear 104 and the peripheral device 106 are configured to wirelessly transmit sensor data to the remote system 108, which may utilize the sensor data to identify events and cause actions, such as audiovisual outputs, from the integrated user interface system 100 generally and, e.g., a display 114 and/or speakers 116 of or connected to the remote system 108 specifically. In various examples, the sensor data may be recorded and/or saved for later use, e.g., by a coaching system for development of a training plan, recovery plan, etc., to achieve a particular goal, e.g., as disclosed in U.S. Provisional Patent Application No. 63/625,814, ESTIMATING METRICS FROM SENSORS OF A WEARABLE ARTICLE, filed Jan. 26, 2024, incorporated by reference herein in its entirety. Any of the article of footwear 104, the peripheral device 106, and the remote system 108 may store such sensor data. Additionally, the sensor data may be presented visually on a user interface, e.g., of the remote system 108. The sensor data may be presented as or otherwise incorporated into a graphical format, such as a chart, drawing, reward logo, or as an aesthetic picture, e.g., as disclosed in U.S. Pat. No. 10,328,308, VISUALIZTION OF ATHLETIC ACTIVITY, filed on Oct. 31, 2017, which is incorporated by reference herein in its entirety.

The integrated user interface system 100 is therefore configured to receive inputs from the user 102 and/or anyone else who is in a position to contribute to providing inputs to the integrated user interface system 100 and provide an output based on those inputs corresponding to certain conditions. As will be disclosed in detail herein, the user 102 is enabled to adapt what inputs are utilized to provide the outputs, how those inputs are interpreted, and what outputs are provided. As can be seen, the user 102 is providing inputs by performing dance moves, in which the moves themselves, the sequence of those moves, the intensity of those moves, and so forth, can be utilized to cause the touchscreen 112 or any other system or device coupled to the integrated user interface system 100 to provide certain predetermined outputs.

As can be seen in the example of FIG. 1, the user 102 is performing macro movements which result in the weight of one foot generally on the back of the foot or on the heel while the weight of the other foot is generally on the front of the foot or the toe. The user 102 further has one arm raised at or above the head of the user 102 while the other arm is lowered, proximate the waist of the user 102. Consequently, one article of footwear 104 will output high pressure on the heel 706 (FIG. 7) and the other article of footwear 104 will output high pressure on the forefoot 602 (FIG. 6), while one peripheral device 106 will output being raised while the other peripheral device 106 will output being lowered. The specific sensor output values associated with each of these events may be context dependent, e.g., on the weight, desired force of the movements, height, and so forth of the user 102. Thus, the integrated user interface system 100 may be calibrated to the user 102, e.g., by the user 102 performing predetermined calibration moves, the result of which may be saved by the integrated user interface system 100.

Each of those states or transition to those states may constitute an event to be identified by the integrated user interface system 100 generally and, in the example of FIG. 1 specifically, the remote system 108. Moreover, the degree to which those events are conducted, e.g., the force of the pressure of the particular region of the foot, may be discriminated against for the purposes of identifying the event. Further, the sequences of events may be discriminated against to identify a larger event. Thus, a time element may be included as an event or as a filter to events, e.g., certain events may be required to happen within a certain amount of time of each other and/or in a certain order.

Figure 2A:
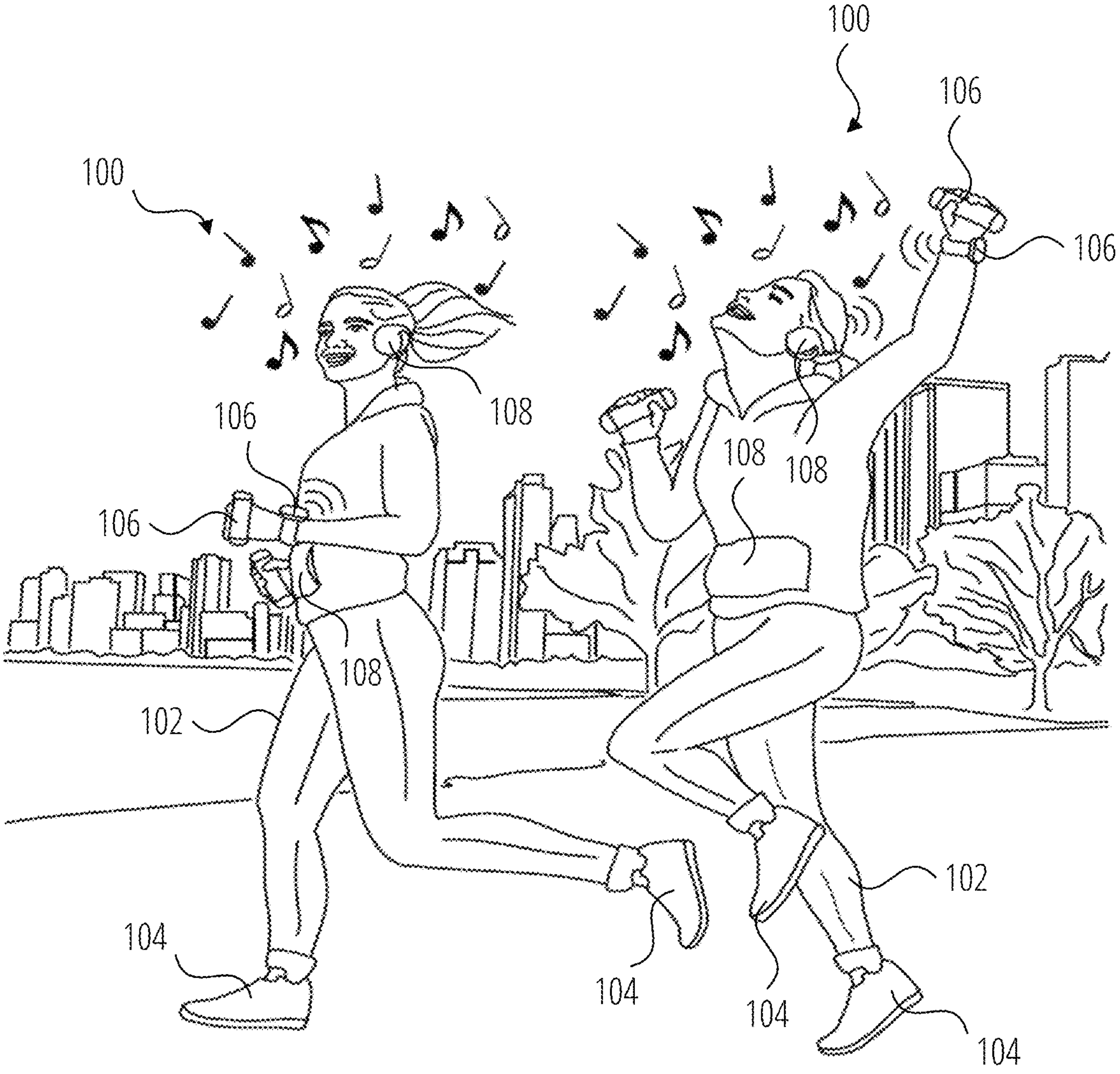
FIG. 2A and FIG. 2B are depictions of the integrated user interface system in different environment and with different users, in embodiments.
Figure 2B:
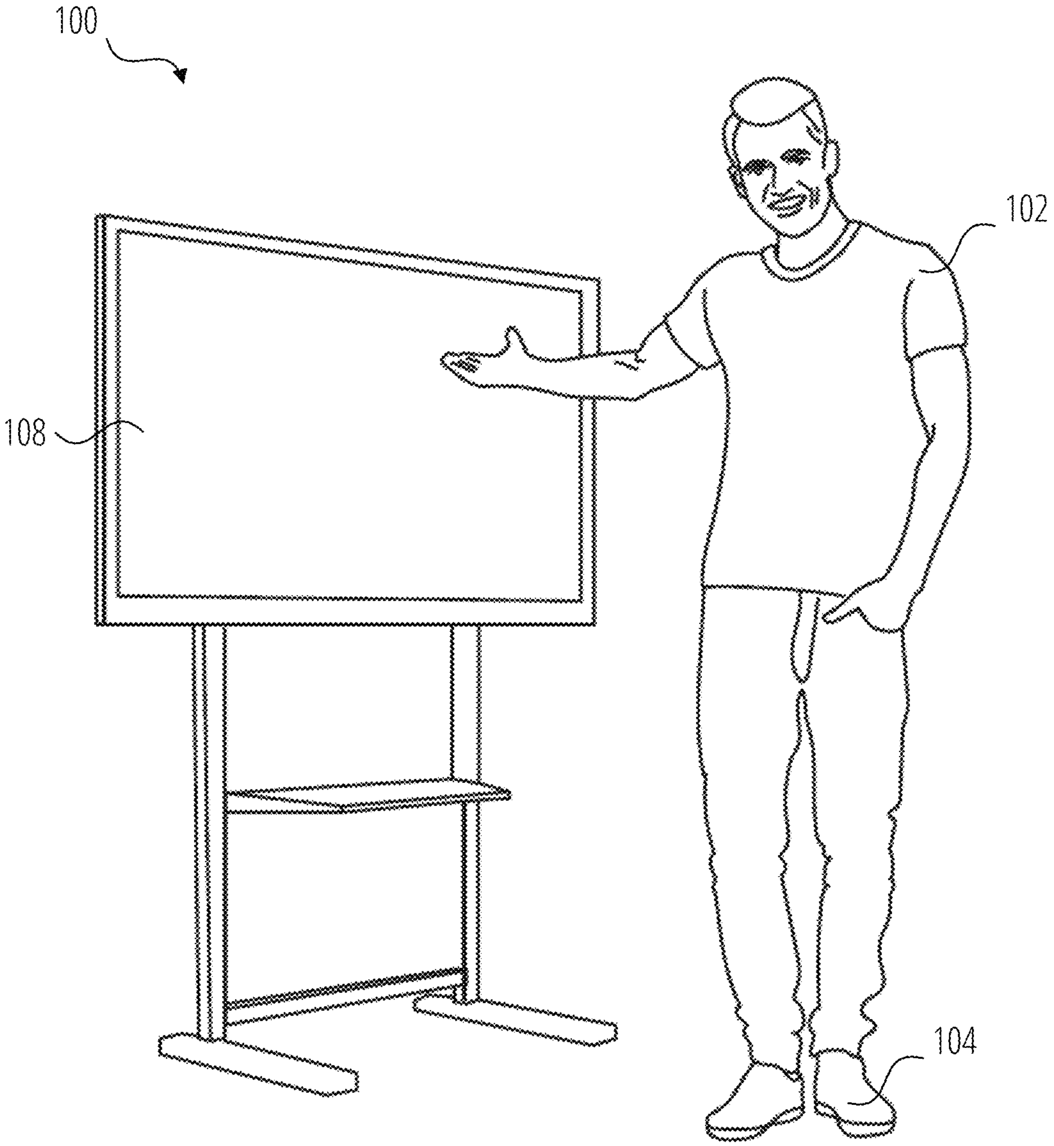

FIG. 2A and FIG. 2B are depictions of the integrated user interface system 100 in different environment and with different users 102, in embodiments. As illustrated in FIG. 2A, multiple users 102 are running, but the principles disclosed with respect to dancing in FIG. 1 apply equally well to a user 102 engaging in a running activity. As illustrated, the integrated user interface system 100 includes the articles of footwear 104, as well as peripheral devices 106, as illustrated handheld or hand wearable weights, and remote systems 108, as illustrated a set of headphones and a mobile device, such as a smartphone held in a pocket around the waist. Further components of the integrated user interface systems 100 are contemplated, including but not limited to an ambulatory assist device, e.g., as disclosed in U.S. patent application Ser. No. 18/444,340, ELECTRO-MECHANICAL AMBULATORY ASSIST DEVICE, filed Aug. 31, 2023; a temperature modulation device, e.g., as disclosed in U.S. Provisional Patent Application No. 63/529,402, FOOTWEAR STRUCTURES PROVIDING COMPRESSION AND THERMAL TREATMENT, filed Jul. 28, 2023; and in an Internet of Adaptive Apparel and Footwear ("IoAAF") or an Internet of Assistive and Adaptive Apparel and Footwear ("IoAAAF") as disclosed in U.S. Provisional Patent Application No. 63/554,515, SMART ELECTROMAGNETIC REACTIVE AIRBAG SYSTEM AND METHOD, filed Feb. 16, 2024, all of which are incorporated by reference herein in their entirety. Additionally, in examples where the users 102 are part of an organized or semi-organized activity, such as a running club or the like, the integrated user interface system 100 of each user 102 individually may allow for communication between the integrated user interface systems 100, including sharing sensor data, music, and other inputs. In various examples, the users 102 may be prompted to provide authorization to share such inputs between the integrated user interface systems 100.

As illustrated in FIG. 2B, the user 102 is not engaged in vigorous physical activity but is instead giving a presentation, e.g., an audiovisual slide presentation. In the illustrated example, the user 102 is wearing the articles of footwear 104 but does not have a peripheral device 106 that is included in the integrated user interface system 100. The integrated user interface system 100 includes a remote system 108 that is configured to display the audiovisual presentation. The integrated user interface system 100 in the illustrated example may be configured to be responsive to micro movements by the user 102, e.g., movements by the users toes or shifts in the weight of the user, e.g., from foot-to-foot or from the front of the foot to the back of the foot, among other possibilities. Consequently, the user 102 may control the operation of the audiovisual presentation, e.g., by advancing or backtracking in a slide presentation, increasing or decreasing volume, starting or stopping a video or audio track, etc.

The integrated user interface system 100 is therefor to be understood as a fully adaptable and configurable system that may utilize any suitable devices in any quantity, receive sensor inputs from any suitable devices in the integrated user interface system 100, and cause outputs, such as audiovisual outputs, on any suitable devices. The integrated user interface system 100 may be operated in any environment not limited to the environments presented herein. For instance, the integrated user interface system 100 may include video game equipment, and the articles of footwear 104 and the peripheral device 106 may combine to provide multidimensional video game inputs, responsive to micro or macro movements by any body part of the user 102 to which the devices are attached or held by. Further conditions or circumstances for utilizing the integrated user interface system 100 to control or interact with other digital environments may include those disclosed in U.S. Pat. No. 11,308,184, VIDEO GAME INTEGRATION OF CRYPTOGRAPHICALLY SECURED DIGITAL ASSETS, Andon et al., issued Apr. 19, 2022, U.S. Pat. No. 11,122,852, INTELLIGENT ELECTRONIC FOOTWEAR AND LOGIC FOR NAVIGATION ASSISTANCE BY AUTOMATED TACTILE, AUDIO, AND VISUAL FEEDBACK, Andon et al., issued Sep. 21, 2021, U.S. Pat. No. 11,475,449, MULTI-LAYER DIGITAL ASSET ARCHITECTURE FOR VIRTUAL AND MIXED REALITY ENVIRONMENTS, Andon et al., issued Oct. 18, 2022, U.S. Patent Application Publication No. 2021/0157844, MOTION-BASED MEDIA CREATION, Andon, published May 27, 2021, and U.S. Pat. No. 11,051,574, INTELLIGENT ELECTRONIC FOOTWEAR AND CONTROL LOGIC FOR AUTOMATED PEDESTRIAN COLLISION AVOIDANCE, Andon, issued Jul. 6, 2021, all of which are incorporated by reference herein in their entirety.

Figure 3:
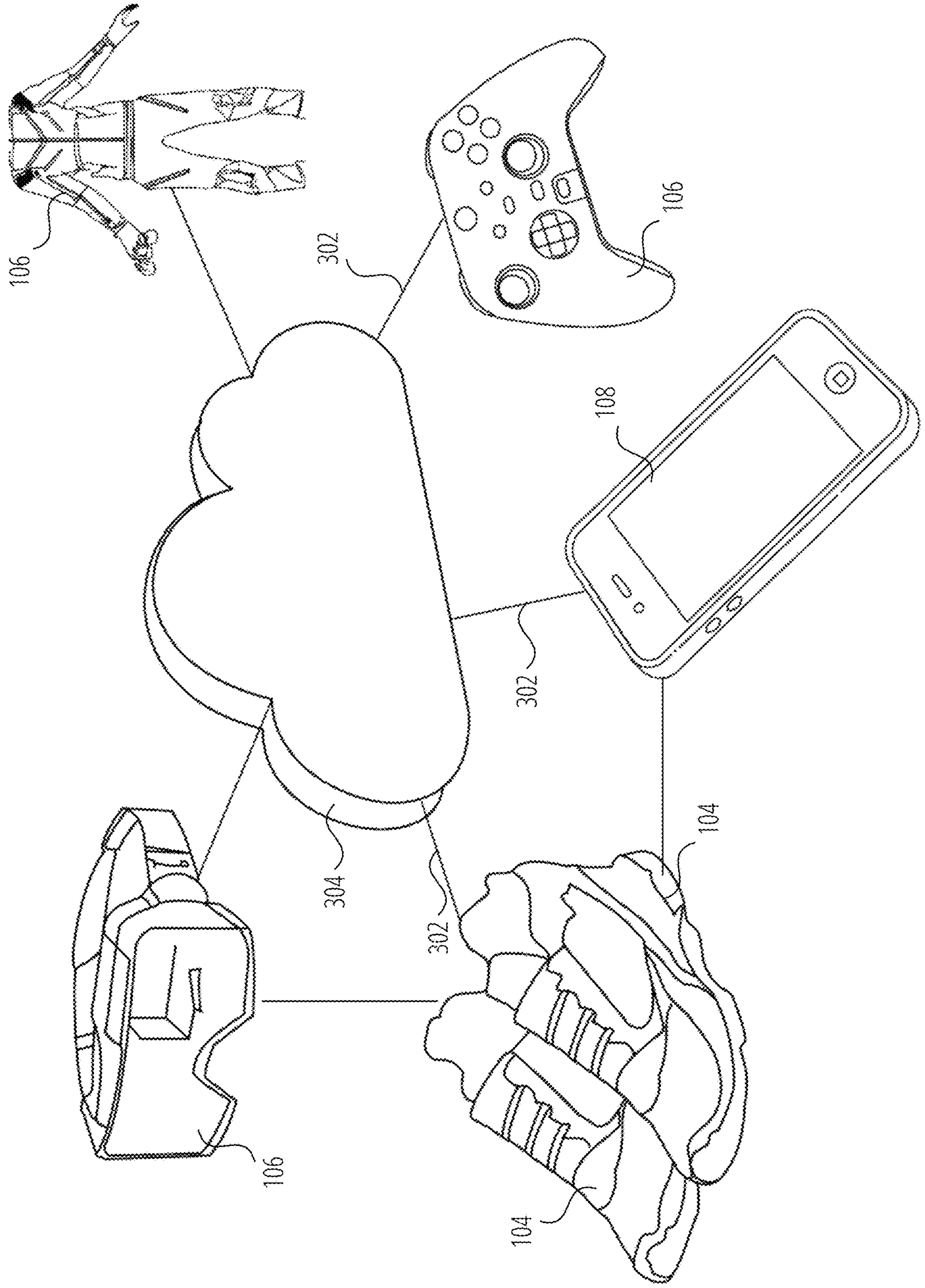
FIG. 3 is a system-level depiction of the integrated user interface system, in an example embodiment.

FIG. 3 is a system-level depiction of the integrated user interface system 100, in an example embodiment. The integrated user interface system 100 is here configured for use in a video game environment, with the articles of footwear 104, a video game controller, virtual reality (VR) goggles or augmented reality (AR) glasses, and a full-body haptic suit as the peripheral device 106, and a mobile device as the remote system 108 all connected by wireless connection 302 to a network 304. The network 304 may be a local network, the Internet, or any suitable centralized or decentralized network. Moreover, while the network 304 is illustrated, it is to be recognized and understood that in various examples the various devices may communicate directly with one another or with one central device, e.g., the remote system 108.

The network 304 may thereby allow each article of footwear 104, peripheral device 106, and remote system 108 to transmit sensor information to and/or receive sensor information from every other device in the integrated user interface system 100. However, it is emphasized that in certain examples certain devices, e.g., one or more of the peripheral devices 106, may be configured only to transmit sensor information rather than receive and certain devices. For instance, the remote system 108 may be configured only to receive sensor information rather than transmit.

In various examples, one or both of the articles of footwear 104 serve as a hub or primary device for sensor information generated by the articles of footwear 104 and secondary devices, e.g., the peripheral devices 106. In such examples, one or both of the articles of footwear 104 act as a controller to receive all sensor information via the network 304 from all of the other responders of the integrated user interface system 100, including the articles of footwear 104 and peripheral devices 106 of the integrated user interface system 100. The article of footwear 104 may consolidate and format the sensor information as appropriate, and forward the sensor information in a predetermined and predicable stream to the remote system 108, which may then process the information and perform actions based on the sensor information as disclosed herein. The principles described with respect to the use of the articles of footwear 104 as a hub apply as well to the use of one or more of the peripheral devices 106 as a hub for the purposes of collection of sensor data from the integrated user interface system 100 in general. The use of an article of footwear 104 or a peripheral device 106 as a hub may be dependent on factors such as the quantity of the sensor data generated, the data speed of the network 304, and the processing power of the various devices of the integrated user interface system 100.

One or more of the articles of footwear 104 may thereby, alone or in combination with other devices of the integrated user interface system 100, serve to control the function of the remote system 108. In such circumstances, the user 102 may control the function of the remote system 108 either partially or entirely through the manipulation of one or more of the articles of footwear 104. Pressing or tapping a certain toe may serve as a selection of an application. Shifting weight to the front, back, medial, or later side of the foot may emulate the movement of a cursor on a menu or desktop environment to allow the selection of an application, menu item, document, and the like. The manipulation of a right article of footwear 104, e.g., a toe tap in the right article of footwear 104, may cause a slide presentation to advance a slide or a video to play forward while the manipulation of the left article of footwear 104, e.g., a toe tap in the left article of footwear 104, may cause a slide presentation to revert to an earlier slide or a video to play in reverse.

Moreover, relatively more complex combinations of manipulations of the articles of footwear 104 allow for further control of the remote system 108 by the articles of footwear 104. As will be disclosed herein, the user 102 may specify any determinable combination of sensor output to result in any desired action by the remote system 108 or by the integrated user interface system 100 generally. Thus, a certain combination of manipulations of one or more of the articles of footwear 104 by the user 102 may start or open an application, cause an application to do a particular thing, close an application, cause, stop, or modify an audiovisual output from the remote system 108, and so forth. The integrated user interface system 100 is thereby able to provide both macro and micro control of the remote system 108 and audiovisual outputs of the integrated user interface system 100 generally.

Figure 4:
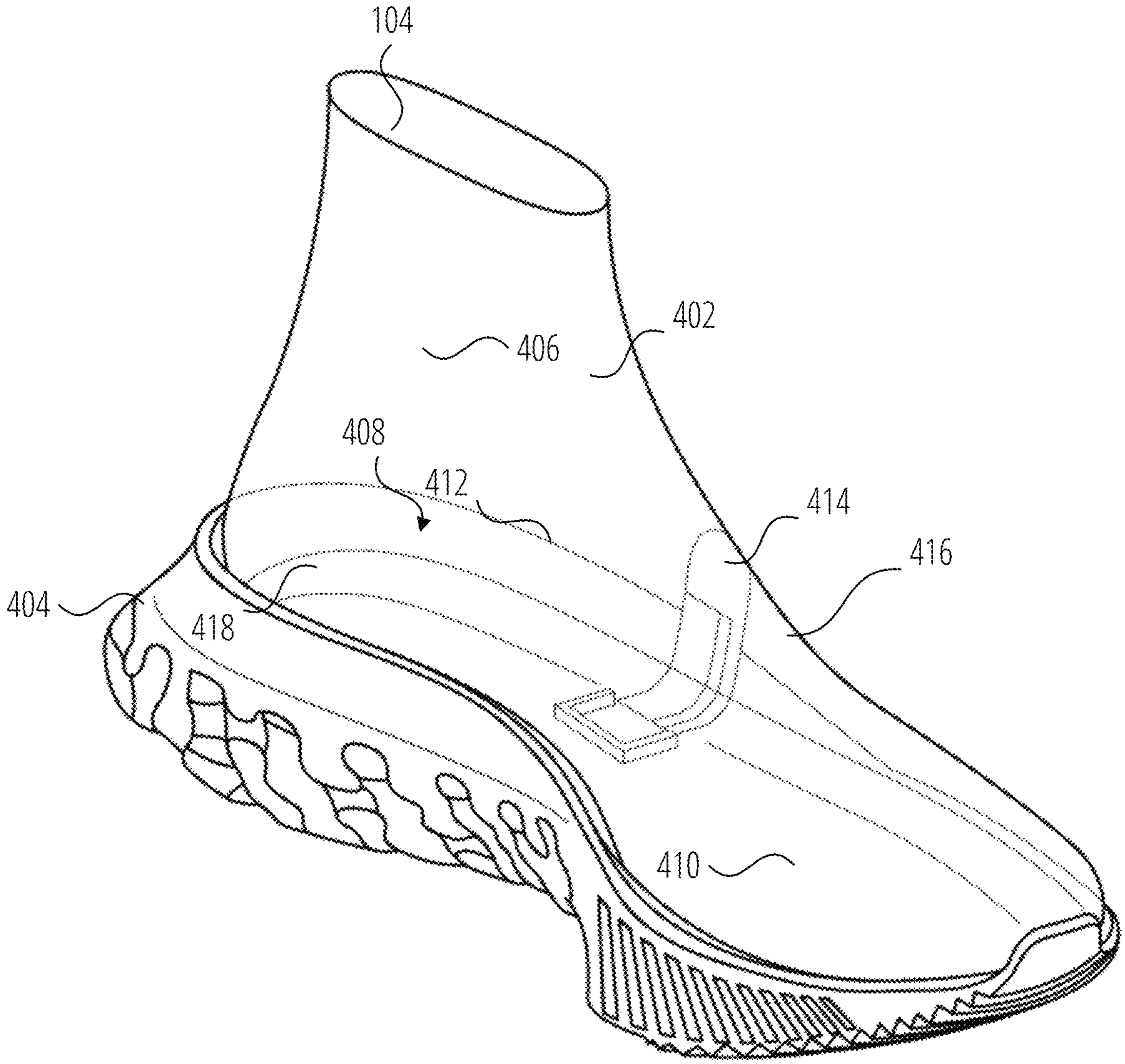
FIG. 4 is a cutaway depiction of an article of footwear, in an example embodiment.

FIG. 4 is a cutaway depiction of an article of footwear 104, in an example embodiment. The article of footwear 104 includes an upper 402 secured to a sole structure 404 forming a void 406 therebetween to admit a foot of a wearer. A liner 408 is inserted into the void 406 and generally runs along a length of the sole structure 404. The liner 408 may be a sock liner, insole insert, or any other suitable article. The liner 408 may provide cushioning for the foot of the wearer as well as the other functions detailed herein.

The liner 408 includes a structure 410 that may provide cushioning and provide support for the other components of the liner 408. The structure 410 may be comprised of conventional foam, polymer/polyurethane, rubber, or any other suitable material to cushion the foot of the wearer of the article of footwear 104 and provide structure for the other components detailed herein. The liner 408 further includes an electronic module 412 and a flexible electronic tab 414. The flexible electronic tab 414 is operatively coupled to the electronic module 412 and, as illustrated, projects out from the electronic module 412 up to and along the upper 402. As illustrated, the flexible electronic tab 414 extends up the lateral side 416 of the upper 402, but in various alternative examples, the flexible electronic tab 414 may extend up the medial side 418 or up any other suitable side of the upper 402.

Figure 5:
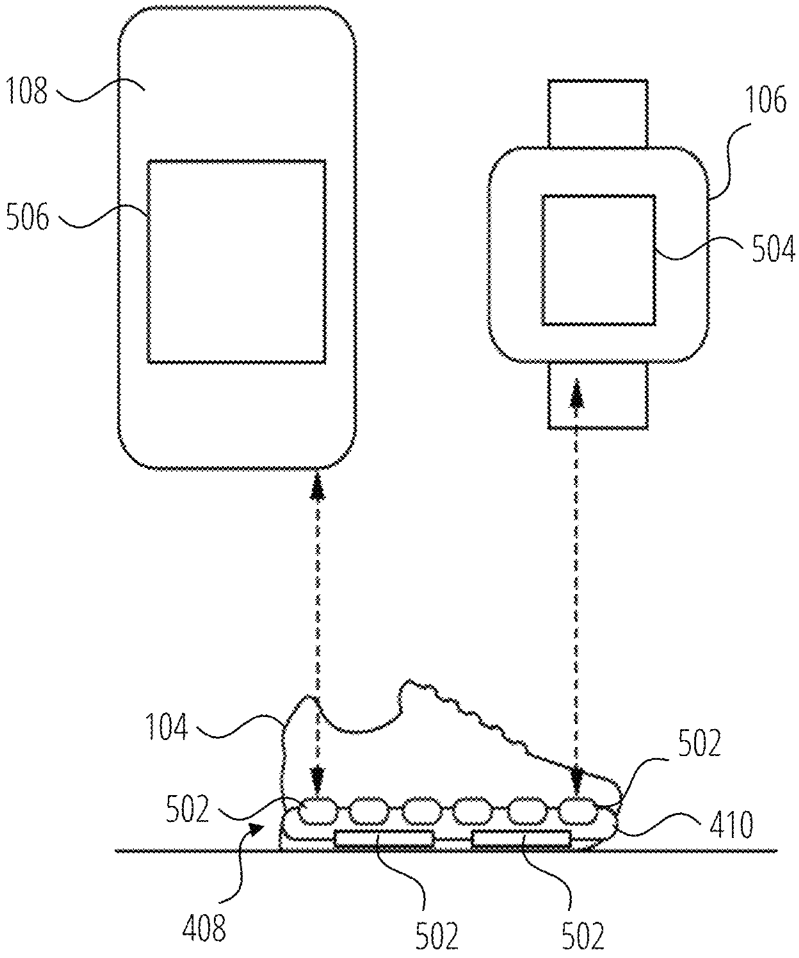
FIG. 5 is a system diagram including the article of footwear, in an example embodiment.

FIG. 5 is a system diagram including the article of footwear 104, in an example embodiment. As illustrated, the article of footwear 104 is in wireless communication with a remote system 108 and a peripheral device 106. The remote system 108 may be a smartphone, tablet, personal computer, and the like. The peripheral device 106 may be a smartwatch or other wearable electronic device. While the remote system 108 and peripheral device 106 are described, it is to be recognized and understood that any remote device may be utilized that includes the necessary wireless communications, processing, and user interface 504 to perform the operations described herein. Moreover, while both the remote system 108 and peripheral device 106 are shown in wireless communication with the article of footwear 104, in various examples only one remote device may be in wireless communication with the article of footwear 104.

The article of footwear 104 includes sensors 502 positioned along the liner 408. As illustrated, the sensors 502 are positioned on the top and bottom of the structure 410, but is it to be recognized and understood that in various examples the sensors 502 may be positioned on one side but not the other of the structure 410. Moreover, in various examples illustrated herein, the sensors 502 are positioned within and enclosed by the structure 410.

In various examples, some or all of the sensors 502 are pressure sensors or other force sensors configured to be sensitive to pressure or force exerted by an external objection, such as the foot of a wearer when the article of footwear 104 is on or is being placed on the foot of the wearer. The use of multiple such pressure sensors arrayed along a length of the liner 408 provides for sensitivity to forces placed on the liner 408, both at different times and in different amounts. Thus, the positioning of the sensors 502 allow for the determination, for instance, of the article of footwear 104 being donned or doffed by the wearer, with the sequence of pressure being placed on and taken off different sensors 502 being indicative of the donning or doffing of the article of footwear 104. The positioning of the sensors 502 may further provide information for the nature of the forces being placed on the liner 408 by the foot and by external forces at different times while being worn. Thus, for instance, landing relatively more heavily on a forefoot region of the article of footwear 104 during a step may be expected to register as more force on a sensor 502 located in the forefoot of the article of footwear 104 than a sensor proximate the heel of the article of footwear 104. These differences in force may be utilized to identify the nature of an activity being performed by a wearer of the article of footwear 104 or to otherwise note different actions by the wearer as manifested by movement of the foot of the wearer.

Figure 6:
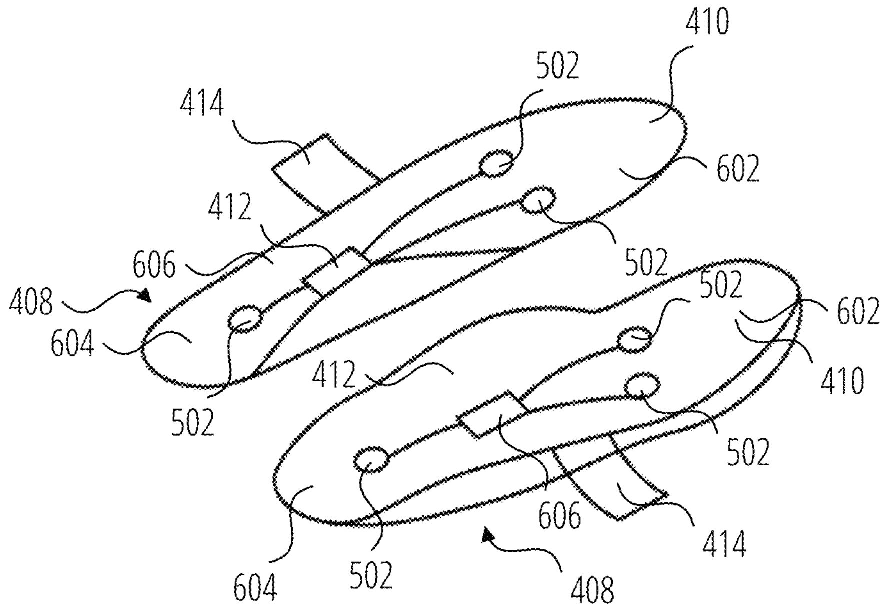
FIG. 6 is a cutaway depiction of a pair of liners configured to be inserted into a pair of articles of footwear, in an example embodiment.

FIG. 6 is a cutaway depiction of a pair of liners 408 configured to be inserted into a pair of articles of footwear, in an example embodiment. As illustrated, each liner 408 includes a pair of sensors 502 positioned in a forefoot 602 region of the liner 408, one sensor 502 positioned in the backfoot 604 region of the liner, and the electronic module 412 positioned at the midfoot 606 region of the liner 408. Each sensor 502 is operatively coupled by wire to the electronic module 412. The flexible electronic tab 414 extends out of the lateral side 416 of the structure 410.

Figure 7:
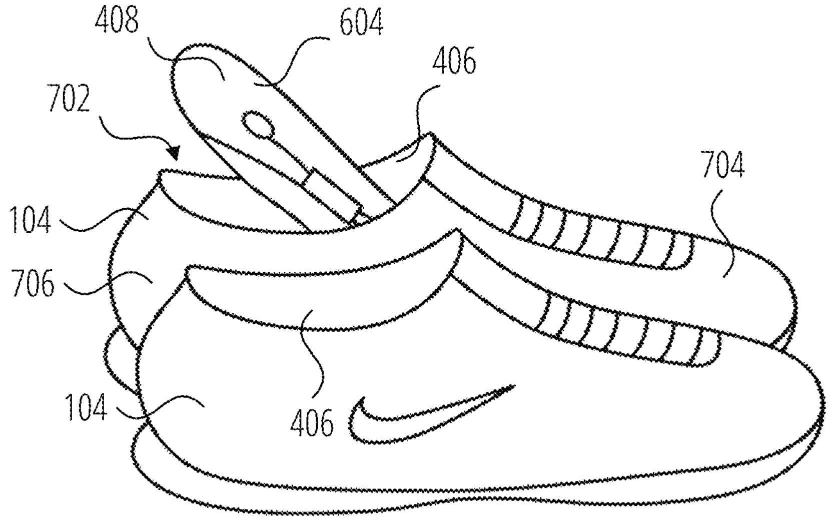
FIG. 7 is a depiction of the insertion of the liner into the void of an article of footwear of a pair of articles of footwear, in an example embodiment.

FIG. 7 is a depiction of the insertion of the liner 408 into the void 406 of an article of footwear 104 of a pair of articles of footwear 702, in an example embodiment. The forefoot 602 region (not depicted) of the liner 408 is inserted into the void 406 first and extended down to the toe 704 of the article of footwear 104. The backfoot 604 is then inserted down to the heel 706.

Figure 8:
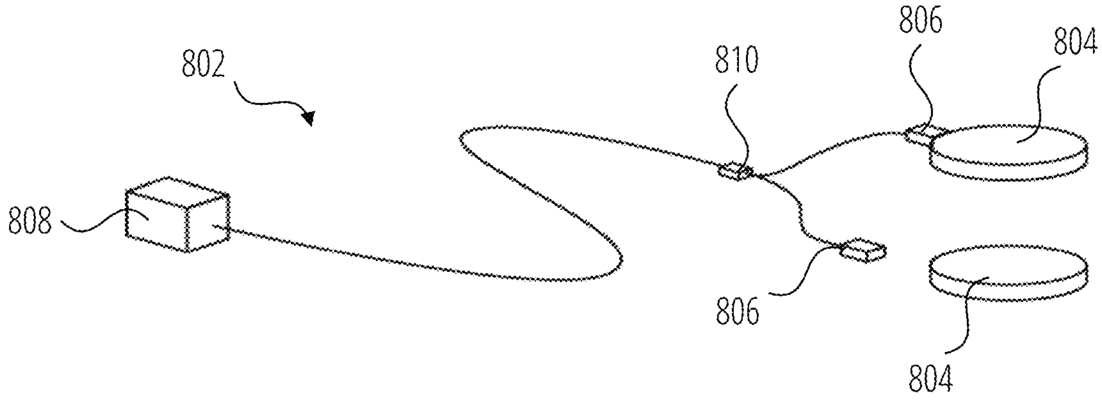
FIG. 8 is a recharge system for the pair of articles of footwear, in an example embodiment.

FIG. 8 is a recharge system 802 for the pair of articles of footwear 702, in an example embodiment. The recharge system 802 includes a pair of recharge units 804, each one configured to correspond to one article of footwear 104 of the pair of articles of footwear 702. Each recharge unit 804 is connected by a connector 806 to a power source 808, e.g., by way of a plug and wall outlet, as illustrated, but optionally by way of any suitable power source, such as a battery or other external power source. In various embodiments, the recharge units 804 may additionally or alternatively include an integrated power source, such as a battery, and may, in certain such embodiments, be wireless or otherwise not include a wired connection to an external power source. The connectors 806 allow the recharge units 804 to be removably coupled to the power source 808 and to be replaced with replacement or alternative recharge units 804. In the illustrated example, the recharge system 802 includes a Y-split 810 to allow for both recharge units 804 to access a single power source 808 while still maintaining each recharge unit 804 in proximity of the other for ease of use, but it is to be recognized and understood that each recharge unit 804 may be directly coupled to the power source 808.

Each recharge unit 804 includes at least one primary recharge antenna, such as an inductive coil, electrically coupled to the power source 808. Each primary recharge antenna is configured to wirelessly, e.g., inductively, energize a secondary or internal recharge antenna in the article of footwear 104, as will be shown herein. The resultant current in the secondary recharge antenna may then be directed to, e.g., a rechargeable power source within the article of footwear 104 to recharge that power source. Each recharge unit 804 may optionally further include an attachment mechanism to encourage alignment with the secondary or internal recharge antenna of the article of footwear 104. The attachment mechanism may be a magnet, a ferrous material configured to be attracted to a magnet included in the article of footwear 104, and/or a mechanical attachment mechanism, such as a hook-and-loop fastener, a snap, or any other suitable mechanical attachment mechanism, to attach the recharge unit 804 to the side of the article of footwear 104. Alternatively, the recharge unit 804 may be configured to be seated within the article of footwear 104, e.g., within the void 406, to be placed in proximity of the secondary recharge antenna.

Figure 9:
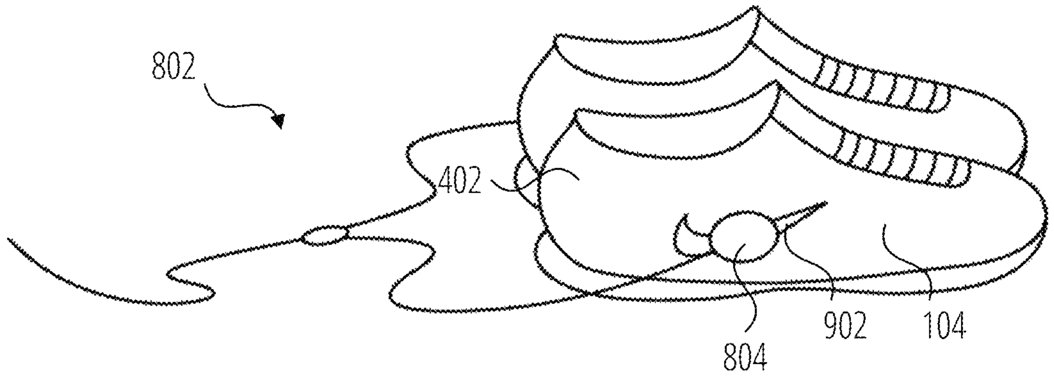
FIG. 9 is a depiction of a us of the recharge system in relation to the pair of articles of footwear, in an example embodiment.

FIG. 9 is a depiction of a us of the recharge system 802 in relation to the pair of articles of footwear 702, in an example embodiment. In the illustrated example, each recharge unit 804 is secured to a lateral side 416 of each article of footwear 104. In the illustrated example, each recharge unit 804 is removably secured proximate a logo 902, to which the flexible electronic tab 414 may, in various examples, extend. The logo 902 may provide an alignment indicia for the placement of the recharge unit 804 in relation to a secondary recharge antenna. In such an example, the flexible electronic tab 414 may include the secondary recharge antenna to wirelessly couple to the primary recharge antenna of the recharge unit 804. However, it is to be recognized and understood that the logo 902 may be incidental to the placement of the recharge unit 804 and that the logo 902 may be optionally omitted altogether or positioned in another location on the article of footwear 104 without respect to the placement of the recharge unit 804.

Additionally or alternatively, the logo 902 may include a lighting element, such as a light emitting device, a light pipe, or any lighting element or combination of lighting elements that may be desired. In such an example, the logo 902 specifically or the article of footwear 104 more generally may include a mechanism to power the lighting element of the logo 902 to cause the logo 902 to illuminate. Such a mechanism may be a passive provision of power from the recharge unit 804 to the lighting of the logo 902, i.e., the lighting for the logo 902 may derive entirely from power from the recharge unit 804 rather than from the rest of the article of footwear 104. Illumination of the logo 902 may be an indication that the recharge unit 804 is properly aligned with the secondary recharge antenna and that charging has begun, may provide an indication of only partial or suboptimal alignment of the recharge unit 804 with the secondary recharge antenna, may provide a status as to an amount of charge that the rechargeable power source of the article of footwear 104 is at, may provide an aesthetic lighting feature, and/or any other lighting effect or combination of lighting effects that may be desired.

Figure 10A:
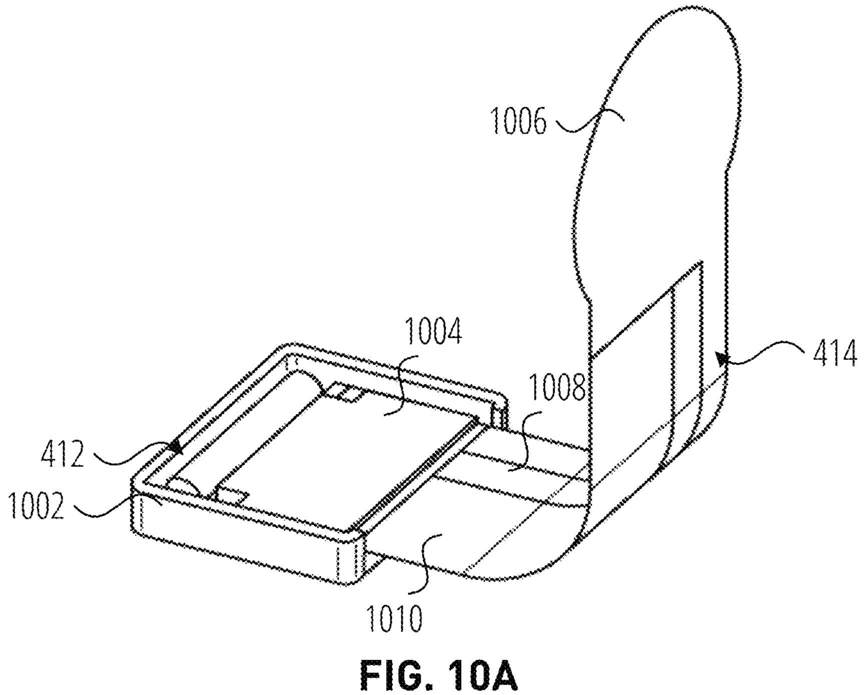
FIG. 10A and FIG. 10B are cutaway perspective drawings of the electronic module and flexible electronic tab, in an example embodiment.
Figure 10B:
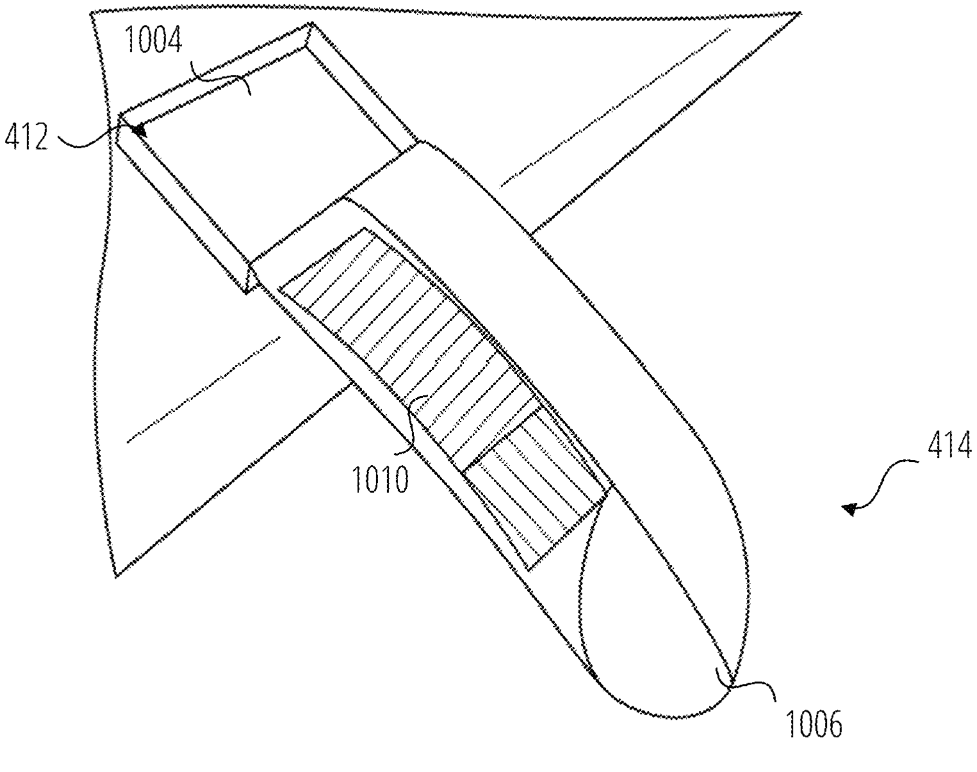

FIG. 10A and FIG. 10B are cutaway perspective drawings of the electronic module 412 and flexible electronic tab 414, in an example embodiment. The electronic module 412 includes a housing 1002 which contains various electronics 1004, which may include but are not necessarily limited to a processor or controller, a power source, such as a rechargeable power source, a sensor, and a wireless transmitter/receiver/transceiver. The flexible electronic tab 414 includes a secondary recharge antenna 1006, as discussed herein, positioned on a flexible substrate 1008, such as a flexible printed circuit board or other suitable flexible substrate. The flexible electronic tab 414 may optionally further include an external wireless antenna 1010 positioned, at least in part on the flexible substrate 1008 and operatively coupled to the electronics 1004 and a wireless transceiver included therewith. The external wireless antenna 1010 may be configured to communicate according to any suitable wireless modality, including but not limited to the Bluetooth low energy (BLE) modality.

In various examples, the housing 1002 has a thickness of four (4) millimeters or less. In various examples, the housing 1002 represents a maximum thickness for all of the electronics of the electronic module 412 and flexible electronic tab 414. Moreover, the four (4) millimeter or less thickness may apply to all of the various alternative examples of the electronic module disclosed herein.

The processor or controller may be any suitable device. In an example, the processor is or may be a part of an micro-electromechanical system (MEMs), e.g., with a 833 Hz data rate. The rechargeable power source may be configured to provide a battery life of at least four hours and, in various examples enough for four (4) hours of use for seven (7) days without recharging. The values presented herein are for illustration and not limitation and any suitable values or components may be utilized as desired for the circumstances in which they are used.

Figure 11A:
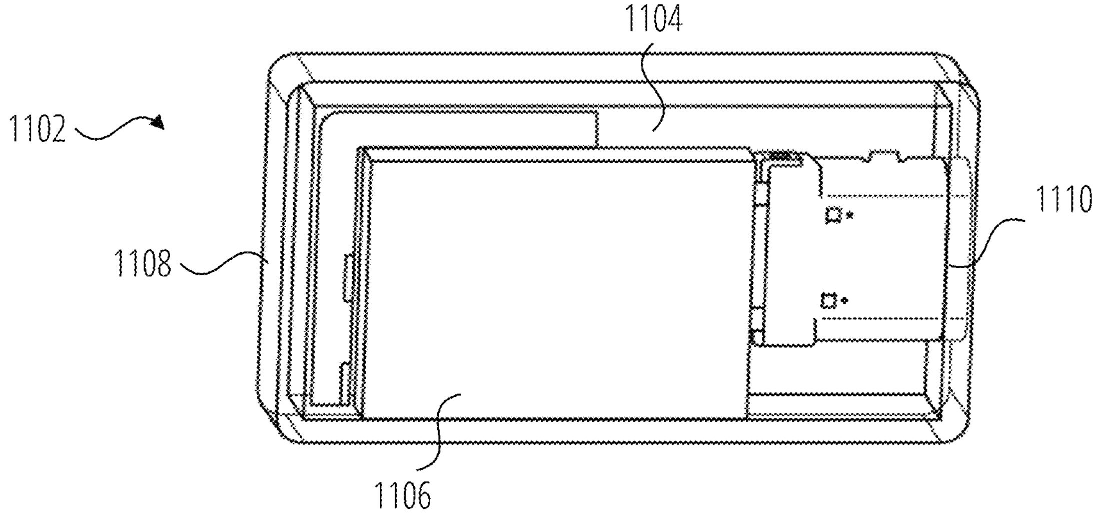
FIG. 11A and FIG. 11B are a cutaway depiction of an alternative example of an electronic module and a use of the electronic module in relation to wider electronics for a liner, in an example embodiment.
Figure 11B:
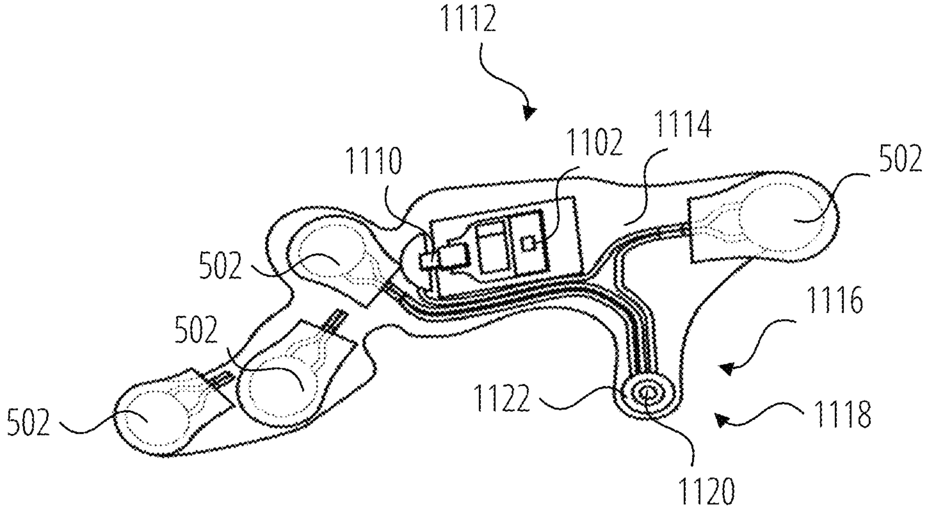

FIG. 11A and FIG. 11B are a cutaway depiction of an alternative example of an electronic module 1102 and a use of the electronic module 1102 in relation to wider electronics for a liner, in an example embodiment. The electronic module 1102 is similar to the electronic module 412 in that it includes a printed circuit board 1104 and a wireless communication internal antenna 1106 positioned within a housing 1108, along with other electronics not depicted but disclosed herein. However, the electronic module 1102 does not include a flexible electronic tab 414 but rather a connector 1110 configured to create a wired electronic connection between the electronic module 1102 and other electronics not included in the electronic module 1102. The connector 1110 may be any suitable electronic connector known in the art, either industry standard such as the various Universal Serial Bus (USB) standards, such as USB-C, and the like, or that may be custom-designed for the purposes of the electronic module 1102.

As illustrated in FIG. 11B, the connector 1110 may the be utilized to provide a wired connection between the electronic module 1102 and liner electronics 1112, illustrated here without respect to the wider structure of a liner 408. In the illustrated example, the liner electronics 1112 include a flexible printed circuit board 1114, sensors 502, such as pressure sensors, and an electronic tab 1116 including a recharge electrode 1118. In the illustrated example, the recharge electrode 1118 includes a central electrode 1120 and a ring electrode 1122, with a recharge connector able to couple over the central electrode 1120 and ring electrode 1122 over substantially an entire circular profile of the recharge electrode 1118. Consequently, a connector on the recharge electrode 1118 would not need to be coupled to the recharge electrode 1118 in a specific orientation but rather any orientation such that one contact is in contact with the central electrode 1120 and another contact is in contact with the ring electrode 1122.

In a further example, the electronic module 1102 may be removed from the article of footwear 104 and/or the liner 408 and plugged into an external device for data transfer, charging of a rechargeable power source, and the like. Alternatively, the electronic module 1102 may be left in the article of footwear 104 and a cable adapted to engage with the connector 1110 inserted into the article of footwear 104 and plugged into the connector 1110 and to an external device to perform the functions noted above. Any suitable mechanism for making a wired electronic connection between the electronic module 1102 and an external device may be utilized in addition to or instead of those noted herein. Moreover, the presence of the wired connector 1110 may be in addition to one or more wireless communications modalities described herein with respect to the internal antenna 1106.

In various examples, the internal antenna 1106 is stamped sheet metal antenna. Such an internal antenna 1106 may be relatively reliable and mechanically simple to produce. In various examples, the internal antenna 1106 may be approximately twenty-eight millimeters long and includes a three millimeter keepout zone.

Figure 12:
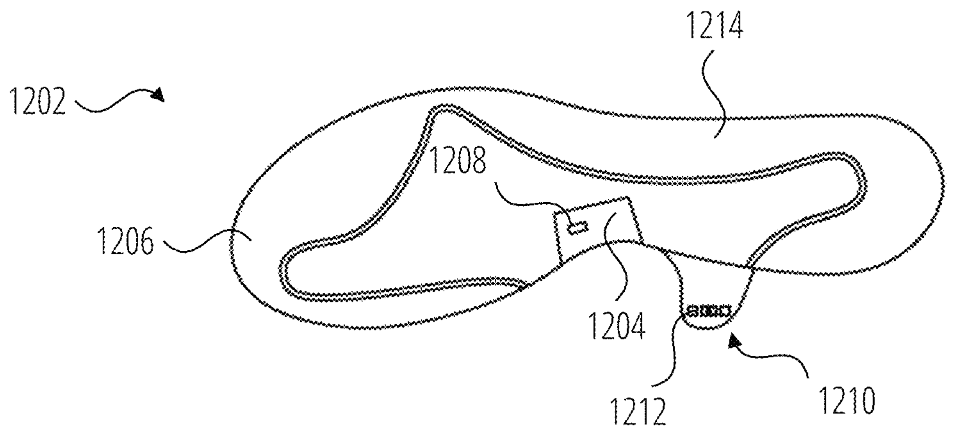
FIG. 12 is a depiction of a liner configured to provide a wired connection to the electronic module, in an example embodiment.

FIG. 12 is a depiction of a liner 1202 configured to provide a wired connection to the electronic module 1102, in an example embodiment. A pocket 1204 is formed in the structure 1206 of the liner 1202. The pocket 1204 is sized to admit the electronic module 1102. A liner connector 1208 is positioned within the pocket 1204 in a position configured to enable the connector 1110 to establish an electrical connection with the liner connector 1208. The pocket 1204 and/or the liner connector 1208 may be configured to removably secure the electronic module 1102 within the pocket 1204, such as via a friction fit or bracket, in order to maintain the contact between the connector 1110 and liner connector 1208 until acted on by an outside force, e.g., a deliberate removal of the electronic module 1102 from the liner 1202 by a user.

The liner 1202 includes an electronic tab 1210. In the illustrated example, the electronic tab 1210 includes a recharge connector 1212 including a more conventional linear array of contacts, in contrast to the recharge electrode 1118. The liner 1202 may otherwise include the liner electronics 1112 illustrated in FIG. 11B, including but not limited to the sensors sensor 502 and so forth, but those components are obscured by the top major surface 1214 of the liner 1202.

Figure 13:
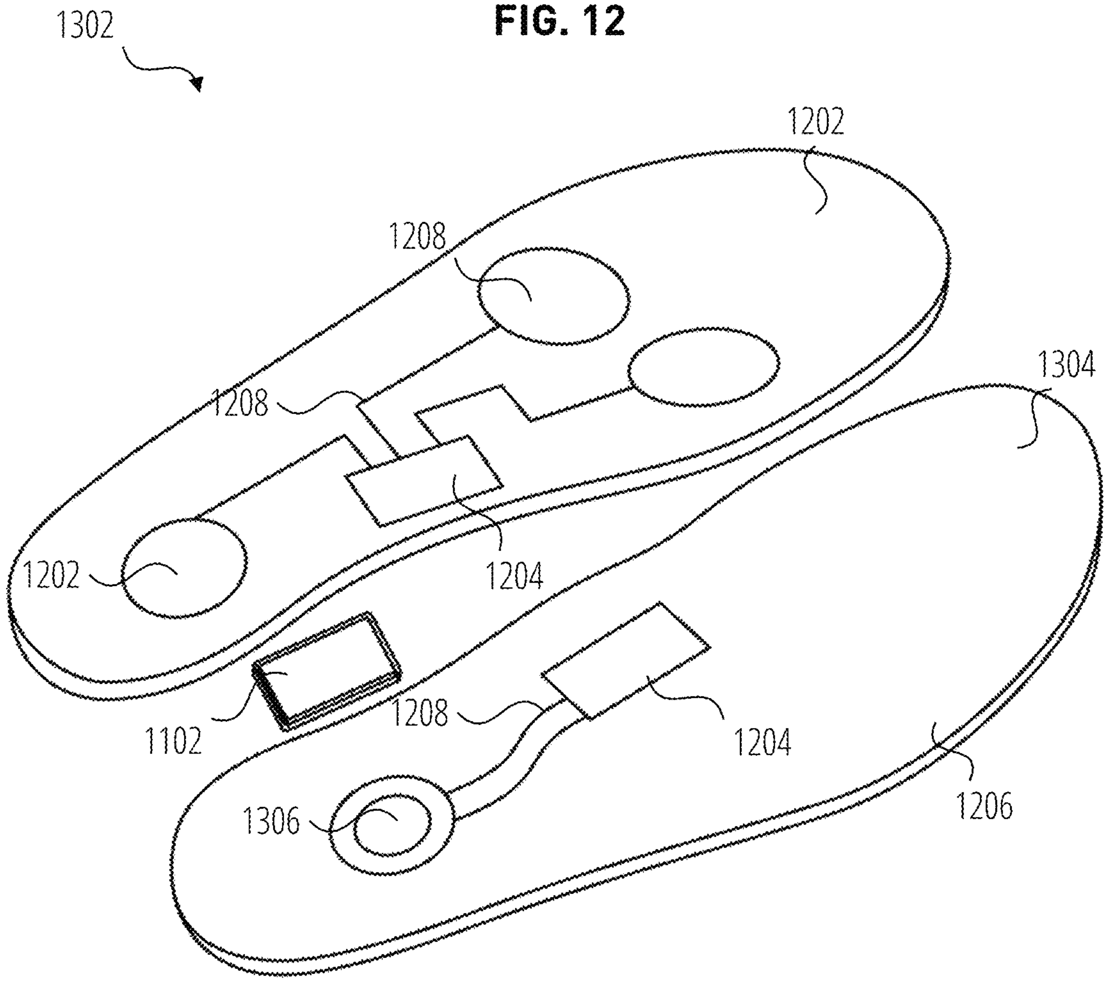
FIG. 13 is a depiction of a modular use for an electronic module in the context of a pair of liners, in an example embodiment.

FIG. 13 is a depiction of a modular use for an electronic module 1102 in the context of a pair of liners 1302, in an example embodiment. The pair of liners 1302 include the liner 1202 as well as a recharge liner 1304. The recharge liner 1304 is configured in a similar way to the liner 1202, including the pocket 1204 and the liner connector 1208. However, in contrast to the sensors 502 included in the liner 1202, the recharge liner 1304 includes a recharge antenna 1306 positioned in the structure 1206, as illustrated proximate the heel 706 of the recharge liner 1304. The pockets 1204 and liner connectors 1208 are thus configured to allow a single to electronic module 1102 to be alternately placed in one of the pair of liners 1302 and then the other, e.g., to operate the sensors 502 in the liner 1202 and then be wirelessly recharged in the recharge liner 1304. Consequently, the electronic module 1102 may be configured to operate interchangeably with both of the pair of liners 1302. Moreover, while a single electronic module 1102 may be switched between the pair of liners 1302, each of the pair of liners 1302 may have its own dedicated electronic module 1102, as appropriate.

Figure 14:
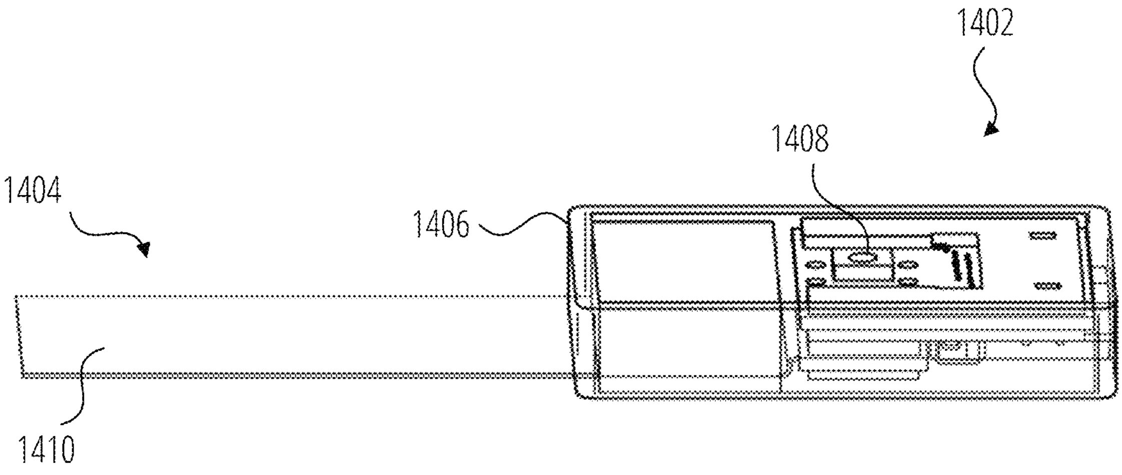
FIG. 14 is an alternative electronic module with electronic tab, in an example embodiment.

FIG. 14 is an alternative electronic module 1402 with electronic tab 1404, in an example embodiment. The electronic module 1402 includes a housing 1406 containing electronics 1408, including a processor or controller, printed circuit board, rechargeable power source, and a wireless antenna, as disclosed herein with respect to other electronic modules. In contrast, however, the electronic module 1402 further includes a ground plane 1410, which is positioned in part within the housing 1406 but also extending out from the housing 1406 along the electronic tab 1404.

The ground plane 1410 is electrically coupled to the wireless antenna positioned within the housing. The size of the ground plane 1410 directly relates to the range and communication efficiency of the wireless antenna. By extending the ground plane 1410 outside of the housing 1406 and along the electronic tab 1404, the size of the ground plane 1410 is increased significantly beyond what would be possible fully contained within the housing 1406. Moreover, by extending the ground plane 1410 outside of the housing 1406, interference from other components of the electronic module 1402 and/or a foot of a wearer may be reduced, further improving range and connection efficiency of the wireless antenna.

Figure 15:
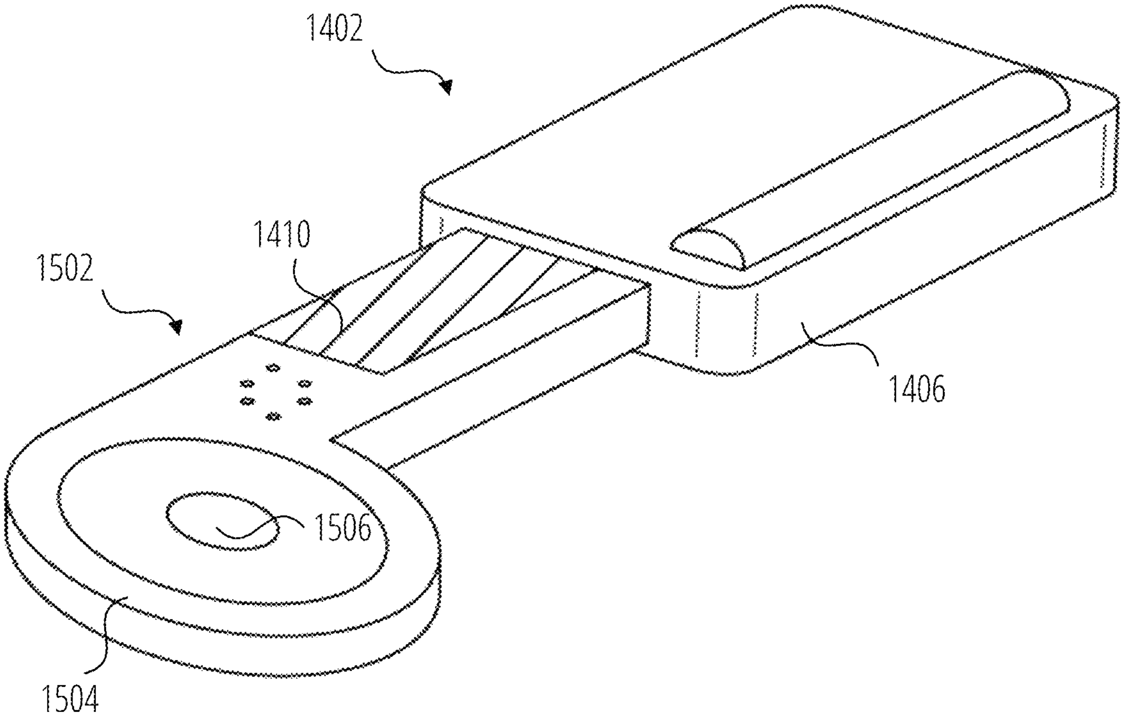
FIG. 15 is the electronic module with an alternative electronic tab, in an example embodiment.

FIG. 15 is the electronic module 1402 with an alternative electronic tab 1502, in an example embodiment. The electronic tab 1502 includes the ground plane 1410 extending out of the housing 1406. The electronic tab 1502 further includes a recharge antenna 1504, as illustrated an inductive coil, and a magnet 1506 positioned within the recharge antenna 1504 to aid alignment with a recharge unit 804 (FIG. 8). In general, the electronic tab 1502 serves to illustrate that components from other examples disclosed herein may be combined with the external ground plane 1410 concept to provide both enhanced wireless communication as well as any other functionality that may be included on an electronic tab 1502.

Figure 16A:
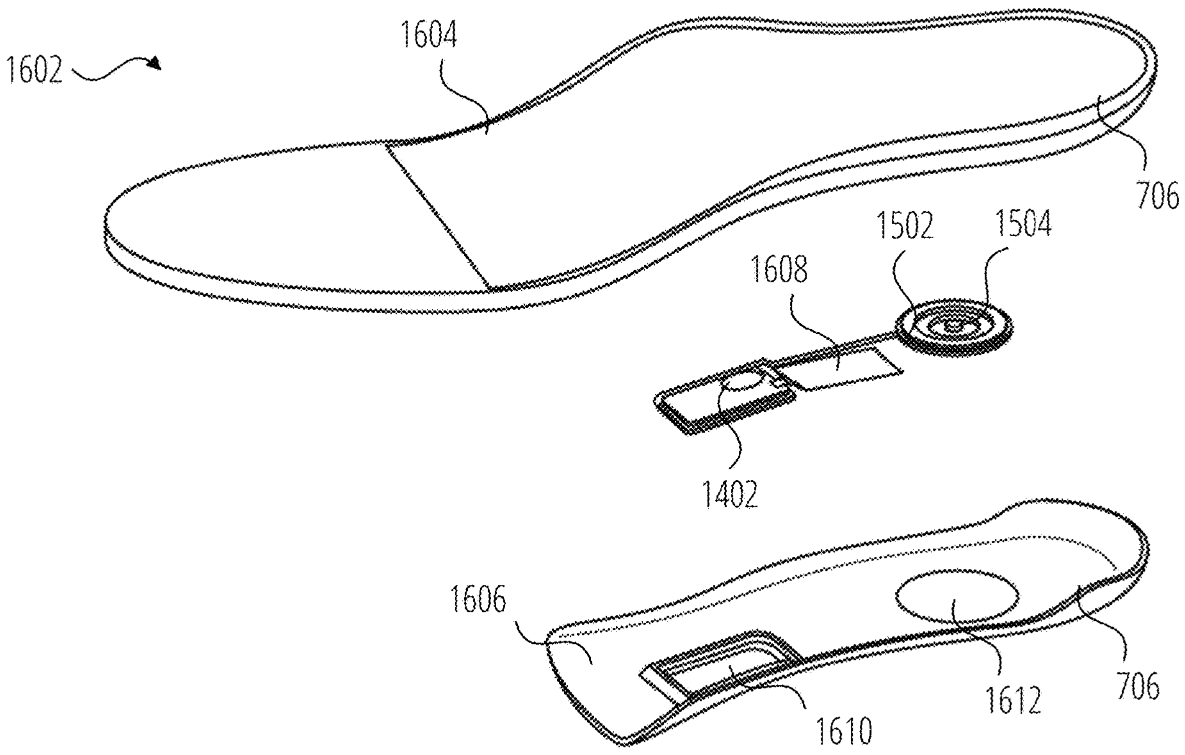
FIG. 16A and FIG. 16B are exploded and top-down depictions, respectively, of a liner, in an example embodiment.
Figure 16B:
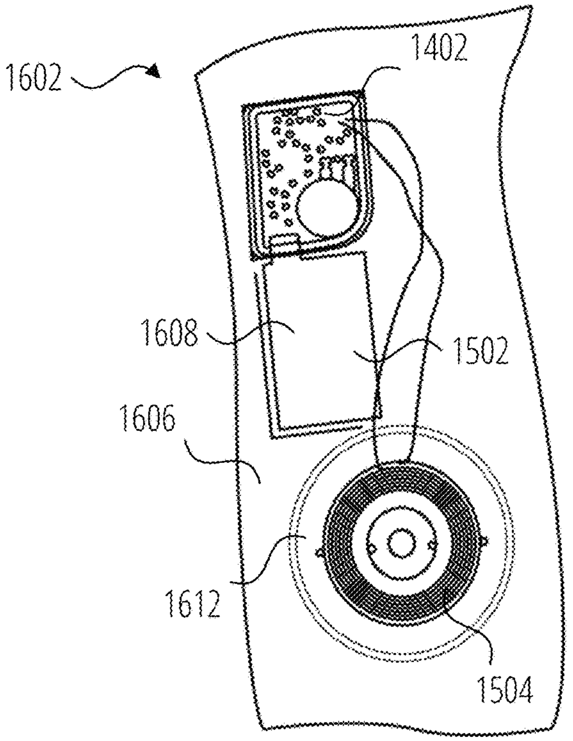

FIG. 16A and FIG. 16B are exploded and top-down depictions, respectively, of a liner 1602, in an example embodiment. The liner 1602 includes a liner structure 1604, a shank 1606, and electronics positioned and enclosed therebetween. The electronics include the electronic module 1402, a recharge antenna 1504, and a ground plane extension 1608, with the recharge antenna 1504 and ground plane extension 1608 forming the electronic tab 1502. The ground plane extension 1608 may be the same and/or operate according to the same principles as the ground plane 1410. In contrast with other liners depicted herein, the electronic tab 1502 as inserted in liner 1602 extends back toward a heel 706 portion of the liner 1602. The electronic module 1402 is seated in an electronics pocket 1610 formed in the shank 1606 and then enclosed by the liner structure 1604. An optional antenna pocket 1612 formed in the shank 1606 may further seat the recharge antenna 1504. The shank 1606 may be formed of a plastic, polymer, metal, or other resilient material that may provide structural support for the article of footwear 104 and which may help protect the electronics of the liner 1602 from damage.

The electronic tab 1502 may be structure to be robust enough to be gripped by a user to facilitate the removal of the electronic module 1402 from the liner 1602 and article of footwear 104 generally. In such an example, the electronic tab 1502 and the components of it may be built robustly enough to be gripped forcefully by a user and to be resilient to forces, including lateral and sheer forces, that may be expected to be imparted by a user overcome normal friction forces that may tend to maintain the electronic module 1402 within the electronics pocket 1610. This may be achieved through normal structural reinforcement of the electronic tab 1502, including thicker and more resilient components than may otherwise be necessitated by the normal operation of the electronic tab 1502.

In various examples, the electronic tab 1502 may be encapsulated with a polymer, such as thermoplastic polyurethane (TPU) or other suitable polymer, to reinforce the structure of the electronic tab 1502 and provide at least some isolation from environmental conditions, such as moisture, sweat, dirt, and the like. The electronic module 1402 and electronic tab 1502 combined may further incorporate a rigid-flex PCB that is rigid within the electronic module 1402 and flexible along the electronic tab 1502. The rigid portion of the PCB may be stacked within the housing 1406 to provide efficient provision of the electronic components included thereon.

Figure 17A:
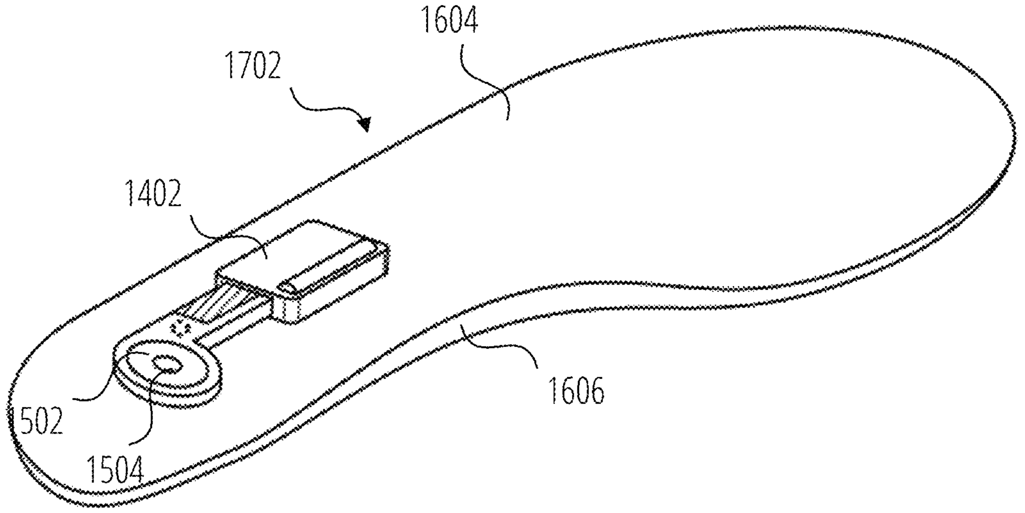
FIG. 17A and FIG. 17B are perspective and top-down depictions, respectively, of a liner, in an example embodiment.
Figure 17B:
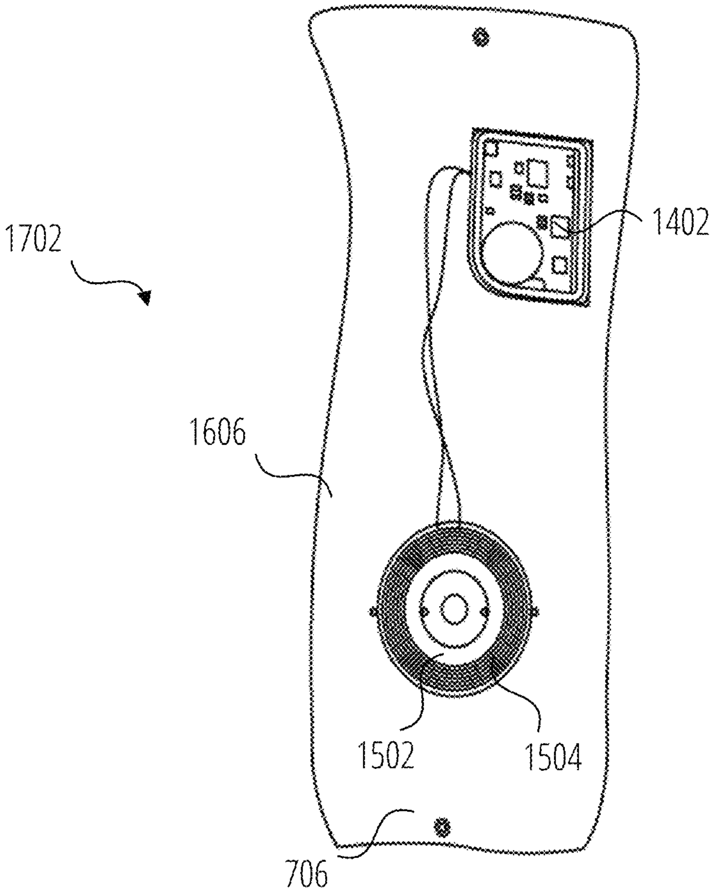

FIG. 17A and FIG. 17B are perspective and top-down depictions, respectively, of a liner 1702, in an example embodiment. The liner 1702 is constructed and is otherwise the same as the liner 1602 and includes the same parts, including the liner structure 1604, shank 1606, electronic module 1402, and recharge antenna 1504. However, the liner 1702 does not include the ground plane extension 1608 as in the liner 1602.

Figure 18:
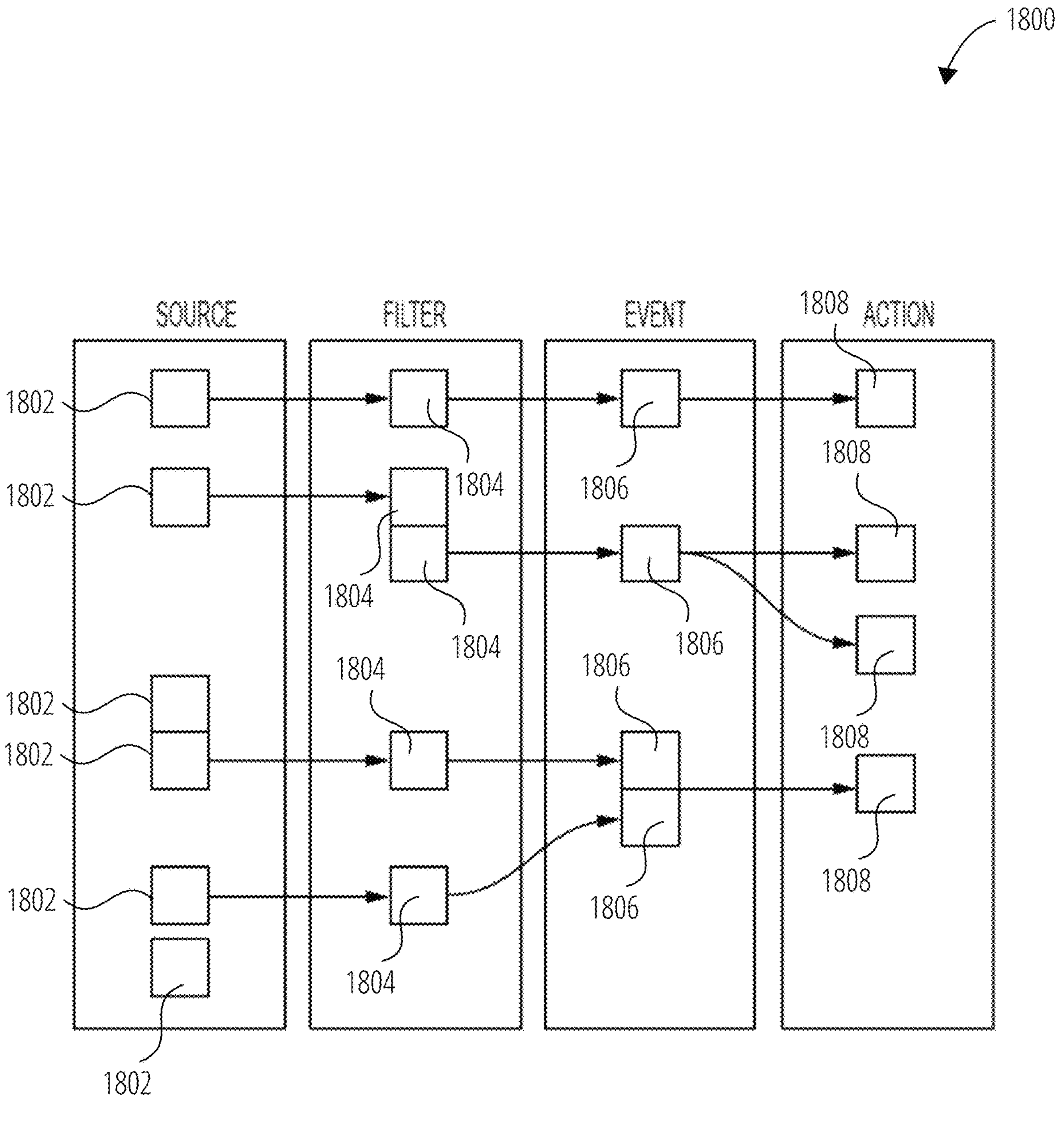
FIG. 18 is a simplified flow diagram for receiving and evaluating sensor data and causing actions on that basis, in an example embodiment.

FIG. 18 is a simplified flow diagram 1800 for receiving and evaluating sensor data and causing actions on that basis, in an example embodiment. Each sensor 502 in the article of footwear 104 and various sensors in the peripheral device 106 and/or remote system 108 may transmit sensor data which may be received as separate sensor data 1802. Filter conditions 1804 may be separately applied to one or more of the sensor data 1802. Based on the application of the filter conditions 1804, events 1806 may be identified. Based on the identification of one or more events 1806, one or more corresponding actions 1808 may be implemented.

Each sensor data 1802 box may correspond to the output from a particular sensor 502 or other sensor in the integrated user interface system 100. Consequently, each individual pressure sensor 502 may correspond to one discrete sensor data 1802 box, while each accelerometer, gyroscope, etc., in the integrated user interface system 100 may similarly correspond to an individual sensor data 1802 box, and so forth. The number of illustrated sensor data 1802 boxes are reduced for the purposes of simplified illustration. The sensor data 1802 may be updated continually, periodically, or on demand, e.g., in the case of bidirectional communication with the associated sensor.

Each filter condition 1804 is associated with the output of one or more sensor data 1802. A given filter condition 1804 may specify e.g., a value and a relationship, e.g., a boolean relationship, for the sensor data 1802 to meet before the sensor data 1802 to qualify for an associated event 1806. Thus, for instance, a filter condition 1804 associated with sensor data 1802 from a pressure sensor 502 from the article of footwear 104 may specify a minimum pressure, a maximum pressure, a pressure range, a specific pressure, a rate of change of pressure, and so forth. A filter condition 1804 associated with sensor data 1802 from an accelerometer may specify a maximum, minimum, range, or specific acceleration, and so forth. As illustrated, multiple filter conditions 1804 may be applied to a single sensor data 1802. Thus, for instance, if the sensor data 1802 is associated with a pressure sensor then a first filter condition 1804 may specify a minimum pressure with a second filter condition 1804 may specify a maximum rate of change in the detected pressure over a predetermined time.

Moreover, as illustrated, multiple sensor data 1802 may be associated with a single filter condition 1804. Thus, for instance, two pressure sensors 502 may both need to meet a minimum pressure value in order for the filter condition 1804 to be met. This may be utilized, e.g., to differentiate between pressure applied by a single toe 704 versus pressure applied by the front of the foot generally. Also, as illustrated, one sensor data 1802 is not associated with any filter condition 1804, event 1806, or action 1808. Consequently, the sensor data 1802 may be collected without being utilized further.

From the filter conditions 1804, events 1806 may be identified. In various examples, the events 1806 may be identified according to any suitable operation, including comparison against predetermined conditions, thresholds, and the like. Additionally or alternatively, the events 1806 may be identified with a trained machine learning model. As illustrated, a given filter condition 1804 may lead to a single event 1806, e.g., a toe tap, or to multiple events 1806, e.g., a toe tap and a forefoot tap. Moreover, multiple filters may lead to one or more events 1806, e.g., a pressure sensor output and an accelerometer output may be interpreted as a foot stomp action.

Finally, the events 1806 lead to actions 1808. As noted, the actions 1808 may be any output from the integrated user interface system 100, such as an audiovisual output, a control to a video game, or the like. Thus, an event 1806 that corresponds to a foot tap may increase or decrease volume, as appropriate, a toe tap may advance a slide in a presentation, a fist pump may flash a light, and so forth. As illustrated, multiple events 1806 may correspond to a single action 1808, e.g., a foot stomp and a fist pump in temporal proximity of one another may produce a different action 1808 than would be produced by a foot stomp or fist pump in isolation, which may or may not have their own individual actions 1808.

Figure 19:
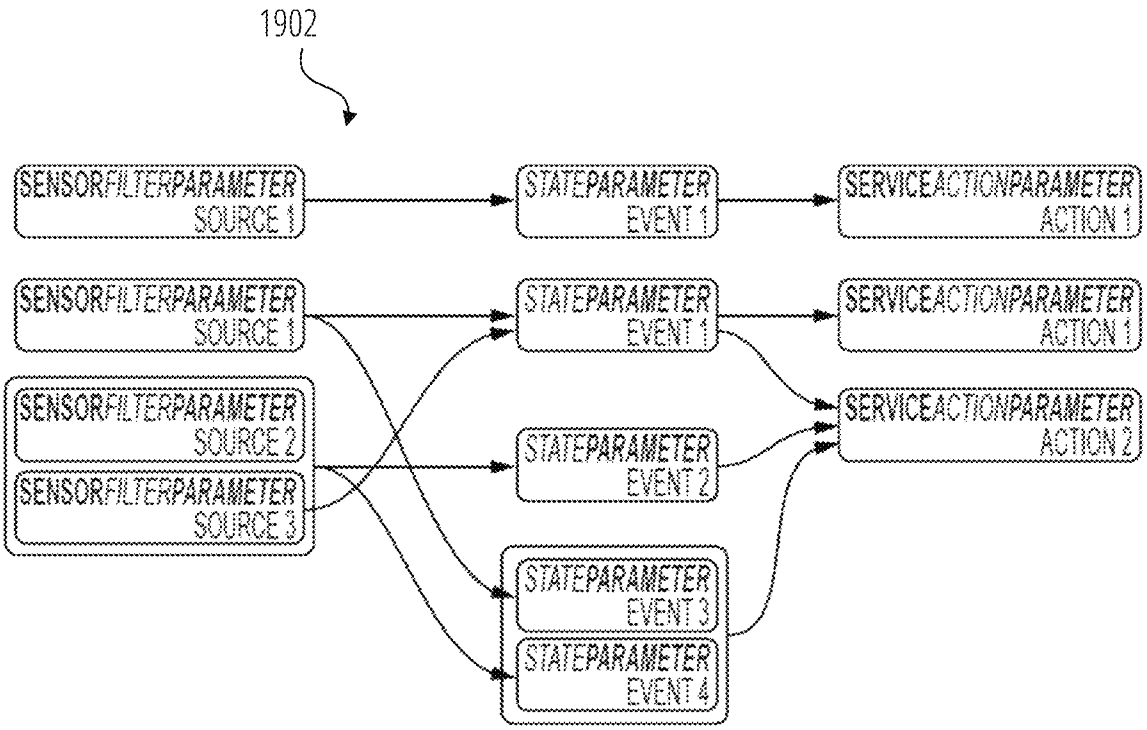
FIG. 19 is a depiction of a user interface for allowing a user to configure the sources, filters, events, and actions of the integrated user interface system, in an example embodiment.

FIG. 19 is a depiction of a user interface 1902 for allowing a user to configure the sources, filters, events, and actions of the integrated user interface system 100, in an example embodiment. The user interface 1902 provides a drag-and-drop configuration to allow a user to create, delete, move, connect, disconnect, sensor data 1802, events 1806, actions 1808, and to set filter conditions. In the illustrated example, the filter conditions 1804 are not separately instantiated and are instead implemented within the context of each sensor data 1802.

As illustrated, a given sensor data 1802 may be instantiated multiple times with different filter conditions. Thus, SOURCE 1 is shown as being instantiated twice, once with a filter condition and once without a filter condition. Consequently, for instance, where SOURCE 1 is a pressure sensor, the presence of any pressure may lead to the identification of an event 1806 with resultant action, while the presence of pressure that meets a particular filter condition, e.g., a minimum pressure, may be utilized by two different events 1806, i.e., EVENT 1 and EVENT 3.

Similarly, EVENT 1 is instantiated twice, once based on a single sensor data 1802 input and once based on multiple sensor data 1802, i.e., SOURCE 1 and SOURCE 3. The output from the instance of EVENT 1 that is based only on SOURCE 1 proceeds to ACTION 1 while the output from the instance of EVENT 1 that is based on SOURCE 1 and SOURCE 3 proceeds to ACTION 1 directly and to ACTION 2 in conjunction with the output of EVENT 2 and EVENT 3. Consequently, while ACTION1 may be based only on the output of EVENT 1, ACTION 2 may require each of EVENT 1, EVENT 2, and EVENT 3 to occur, e.g., within a specified timeframe or without a specified timeframe, before ACTION 2 occurs.

Consequently, the user is able to specify as a sensor data 1802 a local sensor, such as sensor 502, an external sensor, e.g., from the peripheral device 106 or remote system 108, or a fused sensor, i.e., multiple individual sensors. The user is further able to specify filter conditions, including the sensor data 1802 on which the filter condition 1804 is applied and the parameters and/or algorithm of the filter condition 1804. The user is further able to specify the events 1806, including the sensor data 1802 and filter condition 1804 which are applied to the event 1806, the type of event, and the parameters of the event (maximum, minimum, threshold, etc.). The user is further able to specify the actions 1808, including the type of output and the parameters of the output (intensity, length, etc.).

Example sensor data 1802, filter condition 1804, events 1806, and actions 1808 are provided here by way of illustration and not limitation. Example sensor data 1802 for sources may include: a sensor 502 that provides pressure information based on the toe 704 of the user 102; heel pressure; medial foot pressure; lateral foot pressure; an accelerometer sensitive to x-axis acceleration; y-axis acceleration; and z-axis acceleration; a gyroscope sensitive to orientation in the x-axis, y-axis, or z-axis; and a fusion of any or all such sensors. Example filter conditions 1804 may include: specify the average pressure over a rolling two (2) second period; when toe pressure ranges from 3,000 units to 6,000 units; when x-axis acceleration is above 3,000 units; when heel pressure is below 3,000 units; or when toe pressure is outside of the range 3,000 units to 6,000 units. Such filter conditions 1804 may be described in prose or with boolean operators. An example action 1808 may be to play midi notes from A2 to A4; flash one or more lights individually, sequentially, in a predetermined pattern, etc.; pay an audiovisual sequence; etc.

EXAMPLES

Example 1 is an article of footwear, comprising: a sole structure; an upper, coupled to the sole structure and forming a void configured to admit a foot of a wearer; a liner, configured to be inserted in the void and extend along the sole structure, comprising: a structure configured to cushion the foot of the wearer; a sensor positioned in the structure configured to determine a property of the foot of the wearer; an electronic module, configured to be communicatively coupled to the sensor, positioned in the structure; and a flexible electronic tab, operatively coupled to the electronic module, configured to protrude from the structure and extend up along a side of the upper.

In Example 2, the subject matter of Example 1 includes, wherein the electronic tab comprises an antenna configured to communicatively couple to an external antenna.

In Example 3, the subject matter of Example 2 includes, wherein the electronic module includes a rechargeable power source and wherein the antenna is a recharge antenna configured to generate a current based on the external antenna and provide the current to the rechargeable power source.

In Example 4, the subject matter of Example 3 includes, wherein the antenna is an inductive coil.

In Example 5, the subject matter of Examples 2-4 includes, wherein the electronic module includes a wireless transceiver and wherein the antenna is a radio frequency antenna operatively coupled to the transceiver and configured to transmit data to and receive data from the external antenna.

In Example 6, the subject matter of Example 5 includes, wherein the antenna is a first antenna and wherein the flexible electronic tab further includes a second antenna; wherein the electronic module includes a rechargeable power source; and wherein the second antenna is a recharge antenna configured to generate a current based on the external antenna and provide the current to the rechargeable power source.

In Example 7, the subject matter of Examples 2-6 includes, wherein flexible electronic tab includes an electrode configured to be operatively coupled to an external contact.

In Example 8, the subject matter of Example 7 includes, wherein the electronic module includes a rechargeable power source and wherein the electrode is a recharge electrode configured to operatively coupled to an external power source by way of the external contact and provide current to the rechargeable power source.

In Example 9, the subject matter of Example 8 includes, wherein the recharge electrode is configured to contact with the external contact in a predetermined orientation.

In Example 10, the subject matter of Examples 8-9 includes, wherein the recharge electrode is configured to contact with the external contact across a circular range of orientations.

In Example 11, the subject matter of Example 10 includes, wherein the recharge electrode comprises: a central electrode; and a circular electrode substantially encircling the central electrode.

Example 12 is a system, comprising: an article of footwear, comprising: a sole structure; an upper, coupled to the sole structure and forming a void configured to admit a foot of a wearer; a liner, configured to be inserted in the void and extend along the sole structure, comprising: an electronic module positioned in the structure and comprising a rechargeable power source; and a flexible electronic tab, operatively coupled to the electronic module, configured to protrude from the structure and extend up along a side of the upper, and comprising an internal recharge antenna; and a recharge system, comprising a recharge unit, the recharge unit electrically coupled to a power source, the recharge unit comprising an external recharge antenna configured to wirelessly couple to the internal recharge antenna to induce a current in the internal recharge antenna; wherein the article of footwear includes, a securing mechanism to removably secure the recharge unit to the side of the upper.

In Example 13, the subject matter of Example 12 includes, wherein the securing mechanism aligns the external recharge antenna with the internal recharge antenna.

In Example 14, the subject matter of Example 13 includes, wherein the internal and external recharge antennas are inductive coils and the current is induced in the internal recharge antenna inductively.

In Example 15, the subject matter of Example 14 includes, wherein the securing mechanism includes magnet configured to magnetically attract the recharge unit to the upper.

In Example 16, the subject matter of Example 15 includes, wherein the securing mechanism includes a ferrous core of the internal recharge antenna.

In Example 17, the subject matter of Examples 15-16 includes, wherein the recharge unit comprises an external magnet configured to be magnetically attracted to the magnet of the article of footwear.

In Example 18, the subject matter of Examples 13-17 includes, wherein the securing mechanism is a mechanical securing mechanism.

In Example 19, the subject matter of Examples 12-18 includes, wherein the article of footwear is a first article of footwear and the recharge unit is a first recharge unit, and wherein the system further comprises: a second article of footwear including the upper and the liner; and wherein the recharge system comprises a second recharge unit, the recharge system configured to removably secure the first and second recharge units to the uppers of the first and second recharge units, respectively, and induce current in to the rechargeable power sources simultaneously.

Example 20 is a system, comprising: an article of footwear, comprising: a sole structure; an upper, coupled to the sole structure and forming a void configured to admit a foot of a wearer; a liner, configured to be removably inserted in the void and extend along the sole structure, comprising a structure configured to cushion the foot of the wearer; a sensor configured to determine a property of the foot of the wearer; an electronic module, configured to be communicatively coupled to the sensor, positioned in the structure, comprising an internal wireless transceiver configured to transmit information based on data received from the sensor concerning the property of the foot; and an internal antenna, operatively coupled to the wireless transceiver, configured to wirelessly transmit the information from the wireless transceiver; a remote system, comprising: an external antenna configured to wirelessly communicate with the internal antenna; a processor configured to receive and process the information from the article of footwear; and a user interface configured to present the information as processed by the processor.

In Example 21, the subject matter of Example 20 includes, a housing configured to enclose the electronic module, wherein the liner includes a pocket to removably seat the housing in the liner.

In Example 22, the subject matter of Example 21 includes, wherein the housing further encloses the senor.

In Example 23, the subject matter of Example 22 includes, wherein the sensor is a first sensor and further comprising a second sensor positioned within the liner and configured to be operatively coupled to the electronic module.

In Example 24, the subject matter of Example 23 includes, wherein the first sensor is an orientation sensor and the second sensor is a pressure sensor, wherein the orientation sensor is configured to determine an orientation of the article of footwear.

In Example 25, the subject matter of Examples 22-24 includes, wherein the housing further encloses the internal antenna.

In Example 26, the subject matter of Examples 21-25 includes, wherein the electronic module further includes a rechargeable power source to power the electronic module.

In Example 27, the subject matter of Example 26 includes, wherein the housing further includes a recharge mechanism to recharge the rechargeable power source.

In Example 28, the subject matter of Examples 21-27 includes, wherein the pocket is positioned at a midfoot location of the liner configured to be proximate a location of an arch of the foot of the wearer.

In Example 29, the subject matter of Examples 20-28 includes, wherein the electronic module is positioned at a midfoot location of the liner configured to be proximate a location of an arch of the foot of the wearer.

In Example 30, the subject matter of Example 29 includes, wherein the sensor is positioned in one of a forefoot and a backfoot in the liner.

In Example 31, the subject matter of Example 30 includes, wherein the sensor is a pressure sensor.

In Example 32, the subject matter of Example 31 includes, a plurality of pressure sensors including the pressure sensor, wherein at least one of the plurality of pressure sensors is positioned in the forefoot and at least one of the plurality of sensors is positioned in the backfoot.

In Example 33, the subject matter of Example 32 includes, an orientation sensor configured to identify an orientation of the article of footwear.

In Example 34, the subject matter of Example 33 includes, wherein the orientation sensor is a component of the electronic module.

In Example 35, the subject matter of Examples 20-34 includes, wherein the remote device is a wearable article.

In Example 36, the subject matter of Examples 20-35 includes, wherein the remote device is a mobile device.

In Example 37, the subject matter of Examples 20-36 includes, wherein the remote device is accessible by a user different than the wearer.

In Example 38, the subject matter of Example 37 includes, wherein the user interface is further configured to receive a command from the user and the processor is further configured to transmit the command to the electronic module.

Example 39 is a liner configured to be inserted in a void of an article of footwear, comprising: a liner structure; a sensor configured to determine a property of the foot of the wearer; a housing seated at least in part in the liner structure; an electronic module, coupled to the sensor and positioned in the housing, comprising an internal wireless transceiver configured to transmit information based on data received from the sensor concerning the property of the foot; and an internal antenna, positioned within the housing and operatively coupled to the wireless transceiver, configured to wirelessly transmit the information from the wireless transceiver; and a ground plane, operatively coupled to the internal antenna, projecting outside of the housing and extending along the liner structure, configured to extend an effective range of the internal antenna.

In Example 40, the subject matter of Example 39 includes, wherein the ground plane is positioned on a flexible substrate that extends outside of the housing along the liner structure.

In Example 41, the subject matter of Example 40 includes, a rechargeable power source, positioned within the housing, operatively coupled to the electronic module; and a recharge antenna, operatively coupled to the rechargeable power source, positioned on the flexible substrate outside of the housing.

In Example 42, the subject matter of Example 41 includes, wherein the recharge antenna comprises a magnet configured to align an external recharge antenna with the recharge antenna.

In Example 43, the subject matter of Examples 39-42 includes, wherein the sensor is contained within the housing.

In Example 44, the subject matter of Examples 39-43 includes, wherein the sensor is contained, at least in part, within the liner structure.

In Example 45, the subject matter of Examples 39-44 includes, wherein the housing is positioned proximate midfoot region of the liner structure and the ground plane extends toward a heel portion of the liner structure.

In Example 46, the subject matter of Examples 39-45 includes, wherein the ground plane is contained, at least in part, within the liner structure.

In Example 47, the subject matter of Examples 39-46 includes, wherein the ground plane is configured to rest on a major surface of the liner structure.

In Example 48, the subject matter of Examples 39-47 includes, a shank configured to enclose the housing and electronic module with the liner structure.

Example 49 is an integrated user interface system, comprising: an article of footwear, comprising: a sole structure; an upper, coupled to the sole structure and forming a void configured to admit a foot of a wearer; a liner, configured to be inserted in the void and extend along the sole structure, comprising: a structure configured to cushion the foot of the wearer; a plurality of sensors positioned in the structure configured to determine a property of the foot of the wearer; and an electronic module, configured to be communicatively coupled to the sensor, positioned in the structure and including a wireless transmitter configured to wirelessly transmit sensor data from the sensor; a wireless receiver, configured to receive wireless signals from the wireless transmitter; a user interface, configured to allow a user to specify: sensor sources associated with the plurality of sensors; filter conditions associated with one or more of the sensor sources; events, each associated with one or more sensor sources meeting one or more of the filter conditions; and actions, each associated with one or more events; a processor, operatively coupled to the wireless receiver and the user interface, configured to process the sensor sources, filter conditions, events, and actions as specified on the user interface; and an audiovisual output, operatively coupled to the processor, wherein the actions specify a different one of a plurality of effects to be performed by the audiovisual output.

In Example 50, the subject matter of Example 49 includes, a peripheral device, the peripheral device comprising: a peripheral device sensor configured to output a sensor condition to be applied as a sensor source by the processor; and a wireless transmitter, configured to transmit the sensor condition to the wireless receiver.

In Example 51, the subject matter of Example 50 includes, wherein the peripheral device sensor is one of an accelerometer and a gyroscope.

In Example 52, the subject matter of Examples 49-51 includes, a remote device, comprising the wireless receiver, the user interface, and the processor.

In Example 53, the subject matter of Examples 49-52 includes, wherein the plurality of sensors include a plurality of pressure sensors.

In Example 54, the subject matter of Example 53 includes, wherein the plurality of sensors further include at least one of an accelerometer and a gyroscope.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A liner configured to be inserted in a void of an article of footwear, comprising:
- a liner structure;
- a sensor configured to determine a property of the foot of the wearer;
- a housing enclosed at least in part by the liner structure;
- an electronic module, coupled to the sensor and positioned in the housing, comprising:
  - an internal wireless transceiver configured to transmit information based on data received from the sensor concerning the property of the foot; and
  - an internal antenna, positioned within the housing and operatively coupled to the wireless transceiver, configured to wirelessly transmit the information from the wireless transceiver; and
  - a ground plane, operatively coupled to the internal antenna, projecting outside of the housing and extending along the liner structure, configured to extend an effective range of the internal antenna.

2. The liner of claim 1, wherein the ground plane is positioned on a flexible substrate that extends outside of the housing along the liner structure.

3. The liner of claim 2, further comprising:
- a rechargeable power source, positioned within the housing, operatively coupled to the electronic module; and
- a recharge antenna, operatively coupled to the rechargeable power source, positioned on the flexible substrate outside of the housing.

4. The liner of claim 3, wherein the recharge antenna comprises a magnet configured to align an external recharge antenna with the recharge antenna.

5. The liner of claim 1, wherein the sensor is contained within the housing.

6. The liner of claim 1, wherein the sensor is contained, at least in part, within the liner structure.

7. The liner of claim 1, wherein the housing is positioned proximate a midfoot region of the liner structure and the ground plane extends toward a heel portion of the liner structure.

8. The liner of claim 1, wherein the ground plane is contained, at least in part, within the liner structure.

9. The liner of claim 1, wherein the ground plane is configured to rest on a major surface of the liner structure.

10. The liner of claim 1, further comprising a shank configured to enclose the housing and electronic module with the liner structure.

11. A method of making a liner configured to be inserted in a void of an article of footwear, comprising:
- obtaining a liner structure;
- obtaining a sensor configured to determine a property of the foot of the wearer;
- enclosing a enclosed at least in part by the liner structure;
- coupling an electronic module to the sensor and positioned in the housing, the electronic module comprising:

an internal wireless transceiver configured to transmit information based on data received from the sensor concerning the property of the foot; and an internal antenna, positioned within the housing and operatively coupled to the wireless transceiver, configured to wirelessly transmit the information from the wireless transceiver; and a ground plane, operatively coupled to the internal antenna, projecting outside of the housing and extending along the liner structure, configured to extend an effective range of the internal antenna.

12. The method of claim 11, wherein the ground plane is positioned on a flexible substrate that extends outside of the housing along the liner structure.

13. The method of claim 12, further comprising:

positioning a rechargeable power source within the housing;

operatively coupling the rechargeable power source to the electronic module;

positioning a recharge antenna on the flexible substrate outside of the housing; and operatively coupling the recharge antenna to the rechargeable power source.

14. The method of claim 13, wherein the recharge antenna comprises a magnet configured to align an external recharge antenna with the recharge antenna.

15. The method of claim 11, wherein the sensor is contained within the housing.

16. The method of claim 11, wherein the sensor is contained, at least in part, within the liner structure.

17. The method of claim 11, wherein the housing is positioned proximate a midfoot region of the liner structure and the ground plane extends toward a heel portion of the liner structure.

18. The method of claim 11, wherein the ground plane is contained, at least in part, within the liner structure.

19. The method of claim 11, wherein the ground plane is configured to rest on a major surface of the liner structure.

20. The method of claim 11, further comprising a shank configured to enclose the housing and electronic module with the liner structure.

* * * * *